US012572588B2

(12) United States Patent
Sullivan et al.

(10) Patent No.: US 12,572,588 B2
(45) Date of Patent: Mar. 10, 2026

(54) LOCAL PUBLIC NOTIFICATION NETWORK MEDIATION

(71) Applicant: Productive Application Solutions, Inc., Sheridan, WY (US)

(72) Inventors: John Sullivan, Phoenix, AZ (US); Peter Ta, Tucson, AZ (US); Gerald Maliszewski, San Diego, CA (US)

(73) Assignee: Productive Application Solutions, Inc., Sheridan, WY (US)

( * ) Notice: Subject to any disclaimer, the term of this patent is extended or adjusted under 35 U.S.C. 154(b) by 271 days.

(21) Appl. No.: 18/447,402

(22) Filed: Aug. 10, 2023

(65) Prior Publication Data

US 2023/0385879 A1 Nov. 30, 2023

Related U.S. Application Data

(63) Continuation-in-part of application No. 17/962,513, filed on Oct. 9, 2022, now Pat. No. 11,880,869, which is a continuation-in-part of application No. 17/830,783, filed on Jun. 2, 2022, now abandoned, which is a continuation-in-part of application No. 17/830,412, filed on Jun. 2, 2022, which is a continuation-in-part of application No. 17/230,008, filed on Apr. 14, 2021, now Pat. No. 11,270,349, (Continued)

(51) Int. Cl.
| | |
|---|---|
| *G06F 16/487* | (2019.01) |
| *G05D 1/00* | (2024.01) |
| *G06Q 30/0242* | (2023.01) |
| *G06Q 30/0251* | (2023.01) |

(52) U.S. Cl.
CPC ......... *G06F 16/487* (2019.01); *G05D 1/0022* (2013.01); *G05D 1/0094* (2013.01); *G06Q 30/0244* (2013.01); *G06Q 30/0252* (2013.01); *G06Q 30/0267* (2013.01)

(58) Field of Classification Search
CPC .. G06F 16/487; G05D 1/0022; G05D 1/0094; G06Q 30/0244; G06Q 30/0252; G06Q 30/0267
USPC ........................................................ 709/201
See application file for complete search history.

(56) References Cited

U.S. PATENT DOCUMENTS

| | | | | |
|---|---|---|---|---|
| 2003/0233656 | A1* | 12/2003 | Sie ..................... | H04N 21/6587 348/E7.071 |
| 2011/0015989 | A1* | 1/2011 | Tidwell ................. | G06Q 30/02 705/14.43 |

* cited by examiner

*Primary Examiner* — Adil Ocak
(74) *Attorney, Agent, or Firm* — Law Office of Gerald Maliszewski; Gerald Maliszewski

(57) ABSTRACT

A system and method are provided for local network public notification negotiation. A local network includes a plurality of neighborhood media nodes and each neighborhood media node is configured to project a plurality of n media message per a first time period to a general public. The media messages can be public service announcements, such as traffic or weather conditions, or public library hours to name a few examples. An interface associated with the neighborhood media nodes accepts local network program choices including neighborhood media node selections cross-referenced to media message selections. A local arbitrator arranges media messages for each node, resolves local network program choice conflicts, and supplies a local network selection decision to the neighborhood media nodes. The neighborhood media nodes project media messages in response to the local network selection decision. The media nodes can also be enabled to project messages from intra-neighborhood and remote sources.

25 Claims, 13 Drawing Sheets

Related U.S. Application Data which is a continuation-in-part of application No. 17/201,419, filed on Mar. 15, 2021, now Pat. No. 12,112,352, which is a continuation-in-part of application No. 17/179,574, filed on Feb. 19, 2021, now Pat. No. 11,257,120, which is a continuation-in-part of application No. 17/168,313, filed on Feb. 5, 2021, now Pat. No. 12,106,327, which is a continuation-in-part of application No. 17/133,722, filed on Dec. 24, 2020, now Pat. No. 11,055,743, which is a continuation-in-part of application No. 17/097,256, filed on Nov. 13, 2020, now Pat. No. 11,887,163, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation-in-part of application No. 17/007,575, filed on Aug. 31, 2020, now Pat. No. 11,468,477, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 63/310,857, filed on Feb. 16, 2022, provisional application No. 62/779,972, filed on Dec. 14, 2018, provisional application No. 63/431,214, filed on Dec. 8, 2022.

MOBILE
MEDIA
NODE

MOBILE
MEDIA
NODE

MOBILE
MEDIA
NODE

LOCAL PUBLIC NOTIFICATION NETWORK
MEDIATION

RELATED APPLICATIONS

Any and all applications, if any, for which a foreign or
domestic priority claim is identified in the Application Data
Sheet of the present application are hereby incorporated by
reference under 37 CFR 1.57.

BACKGROUND OF THE INVENTION

Field of the Invention

This invention generally relates to public notification
services and, more particularly, to a system and method that
negotiates the projection of media messages within a local
network.

Description of the Related Art

Market research shows that outdoor public announcement
space has increasingly become harder to find and, hence. At
the same time, automotive vehicles are one of the most
costly expenses incurred by the average consumer. Ironi-
cally, most automobiles sit idle for a large portion of the day.
U.S. Pat. No. 10,796,340, entitled SYSTEM AND
METHOD FOR TARGETING THE DISTRIBUTION OF
MEDIA FROM A MOBILE PLATFORM, invented by Peter
Ta et al., and filed on Oct. 14, 2019, addresses to problem of
finding more public notification space by providing an
automotive targeted parking system that adds to an automo-
bile the additional feature of a public notice display subsys-
tem, and which may also include a Wireless Local Area
Network (WLAN) IEEE 802.11 (WiFi) access point (hot-
spot).

While the above-described system addresses the provi-
sion of additional outdoor public notice through the use of
automobiles, the act of parking remains a potential issue.
Parking in many desirable locations in metropolitan areas is
often limited to one or two hours only. Further, the necessity
of frequently changing parking spots can become a burden
and may make the use of their automobile as a public
notification node impractical for some owners.

Parent U.S. Pat. No. 10,991,007, entitled AERIAL BILL-
BOARD, invented by Peter Ta et al, and filed on Sep. 17,
2020, provides for the use of aircraft, such as unmanned
aerial vehicles (UAVs), as another type of public notification
platform. However, battery operated devices have time
limitations due to the need for recharging, and potential air
space legal restrictions may exist in some regions.

Parent U.S. Ser. No. 17/983,545, entitled PEDESTRIAN
THOROUGHFARE PORTABLE MEDIA KIOSK, filed
Nov. 9, 2022 and 2021 extends display potential by describ-
ing a pedestrian public notification system kiosk chassis and
parent U.S. Ser. No. 17/168,313, entitled SYSTEM AND
METHOD FOR THIRD PARTY MOBILE MEDIA CON-
TROL, filed on February 5, also includes a movement
subsystem configured for moving the chassis on a pedestrian
thoroughfare.

Parent U.S. Pat. No. 11,270,349, entitled PORTABLE
BILLBOARD, filed on Apr. 4, 2021, and issued on Mar. 8,
2022, describes a portable public notification display and
targeting subsystem, where the display mechanism verifies
its position in a value weighted target stationary location,
and communicates verification information.

It would be advantageous if the entities managing por-
table kiosks and displays had greater control over local
public notices so as to be more responsive to local events.

In addition, it would be advantageous if remote entities
had a greater ability to interact with and update local public
notification mechanisms.

SUMMARY OF THE INVENTION

A system and method are disclosed herein permitting the
managers of local public notice displays to have greater
control over their locally managed displays, while at the
same time being able to interact with other displays in the
same neighborhood. In addition, the system and method
accept public notification content provided from remote
information sources located outside of the neighborhood. To
that end, local networks are established including several
display mechanisms located in the same neighborhood. A
neighborhood display manager has the ability to organize,
add, and manage content on their own display, as well as
content on other displays in the neighborhood. A neighbor-
hood arbitrator resolves display use issues in the event that
a particular display is unavailable to accept all requests for
use by the neighborhood managers. In addition, remote
entities outside the neighborhood can also request the use of
the neighborhood public notice displays. Again, an arbitrator
resolves display use issues in the event that a particular
display is unavailable to accept all requests for use by the
neighborhood managers and remote entities. Further, mem-
bers of the general public have the potential to gain access
to the system and post personal messages.

Accordingly, a method for local network public notifica-
tion negotiation is provided. The method provides a local
network with a plurality of neighborhood media nodes. The
local network may be organized as an Intranet for example.
Each neighborhood media node is configured to project a
plurality of n media message per a first time period to a
general public. The media messages can be public service
announcements, such as traffic or weather conditions, news
stories, or public library hours to name a few examples. A
user interface (UI) associated with the neighborhood media
nodes accepts local network program choices including
neighborhood media node selections cross-referenced to
media message selections. More explicitly, the UI is a means
for a user to access the local network and is not intended to
describe any particular communication device. For example,
the UI can represent a user accessing a local network website
with a password, a smartphone application (following veri-
fication), or a neighborhood media node UI (following
verification). The local arbitrator arranges the messages to
be displayed, the media nodes at which the messages are
projected, and the message projection times. In the event
that there are too many requests for a particular media node
at a particular time, a local arbitrator resolves local network
program choice conflicts, and supplies a local network
selection decision to the neighborhood media nodes. The
neighborhood media nodes project media messages in
response to the local network selection decision.

In one aspect the local arbitrator accepts remote media
messages supplied by a remote network source external to
the local network. The local arbitrator organizes the local
requests with the remote requests and again, if necessary,
resolves conflicts over the use of the neighborhood media
nodes. Then, the neighborhood media nodes project a com-
bination of neighborhood media messages and remote media
messages, cross-referenced to neighborhood media nodes,
responsive to the local network selection decision. Alternatively, a remote arbitrator accepts the local selection decision and a remote selection decision, arranges messages to be projected at corresponding media nodes, resolves conflicts between the local selection decision and remote selection decision if necessary, and supplies a final selection decision. Then, the neighborhood media nodes project the media messages in response to a final selection decision. The remote arbitrator may supply a final selection decision selecting a maximum number of m neighborhood media messages per first time period for each neighborhood media node, where m is an integer less than or equal to n.

In the case of there being several local networks interacting with each other, the remote arbitrator may accept the remote selection decision and a plurality of local selection decisions. Then, the remote arbitrator may act to arrange messages in the plurality of local networks, and resolve any conflicts between the plurality of local selection decisions and the remote selection decision if necessary.

The local arbitrator may supply a decision selecting a maximum number of p neighborhood media messages per first time period for each neighborhood media node, where p is an integer less than or equal to n. In more detail, requests by local neighborhood users can be organized in two different categories: home-neighborhood media messages and inter-neighborhood media messages. A neighborhood media message explicitly associated with a first neighborhood media node is considered a home-neighborhood media message with respect to the first neighborhood media node. This applies to the case, for example, where the manager of the first neighborhood media node seeks to put a public notice of their own choosing on their own media node. The local arbitrator may supply a decision selecting a maximum number of t home-neighborhood media messages and a minimum number of q home-neighborhood media messages for each neighborhood media node per first time period, where t is an integer less than or equal to n, and q is less than or equal to t.

Otherwise, a neighborhood media message explicitly associated with a second neighborhood media node is considered an inter-neighborhood media message with respect to a first neighborhood media node. This is the case where the manager of the second neighborhood media node seeks to put a public notice of their choosing on the first neighborhood media node. The local arbitrator may supply a local network selection decision selecting a maximum number of r inter-neighborhood media messages for each neighborhood media node, where r is an integer less than or equal to n. Alternatively, a remote arbitrator may supply the inter-network media message decisions.

In another aspect, requests can come from users in other local networks, e.g., a local network associated with a nearby neighborhood. A neighborhood media message explicitly associated with a second local network or a neighborhood media node in the second local network is considered an intra-local media message with respect to a first local network neighborhood media node. In this case the local arbitrator may supply a local network selection decision selecting a maximum number of s intra-local media messages for each neighbor media node, where s is an integer less than or equal to n. As described in more detail below, members of the general public may also be entitled to post messages on local network media nodes on a restricted basis, and as another alternative, a remote arbitrator may supply the intra-network media message decisions.

Additional details of the above-described method, and a system for local public service network negotiation, are provided below.

BRIEF DESCRIPTION OF THE DRAWINGS

FIG. 6A is a plan view example of a local network with neighborhood media nodes, while

DETAILED DESCRIPTION

Figure 1A:
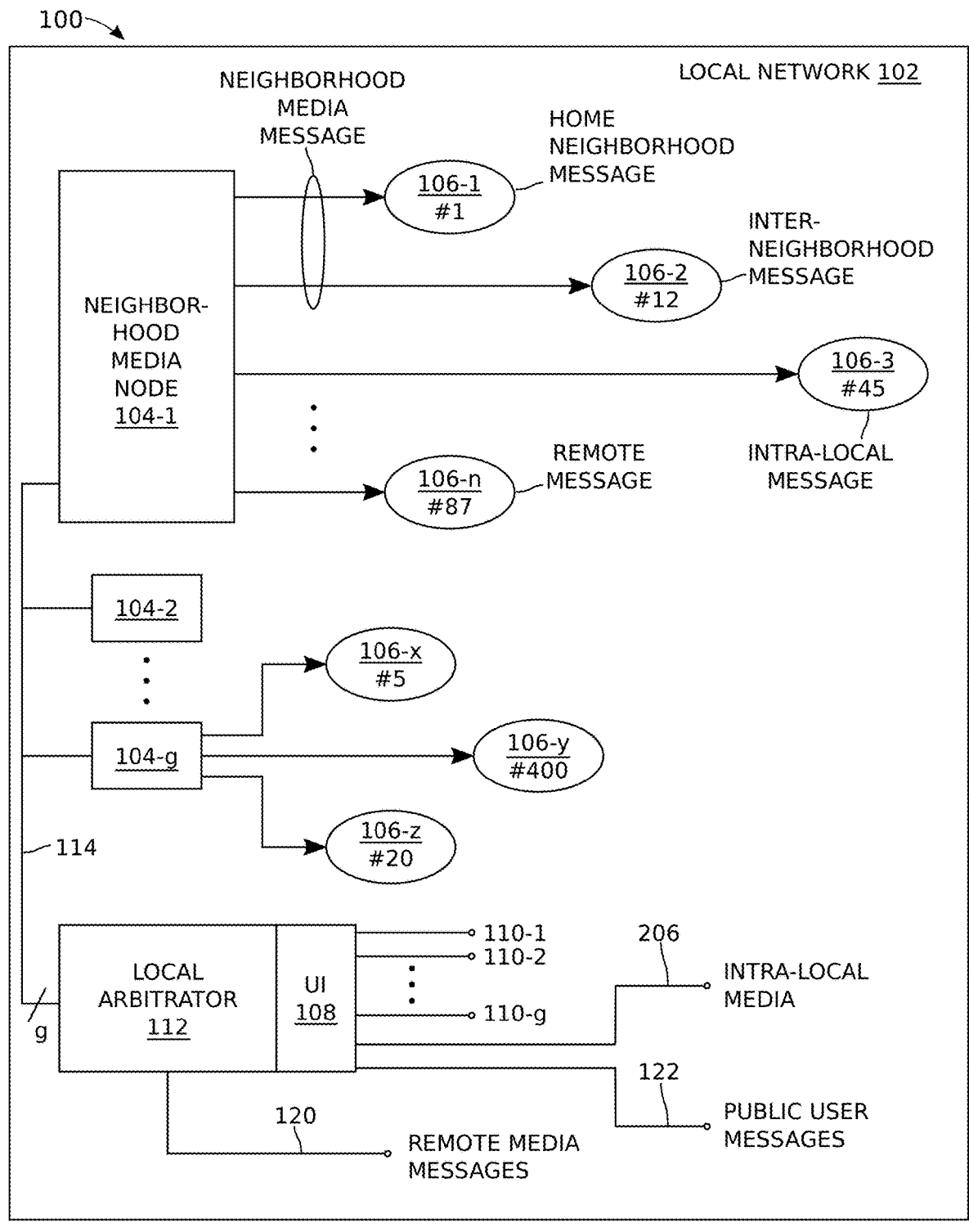
FIG. 1A is a schematic block diagram of a system for local network public notification negotiation and FIG. 1B depicts the mechanics of an exemplary local network selection decision.
Figure 1B:
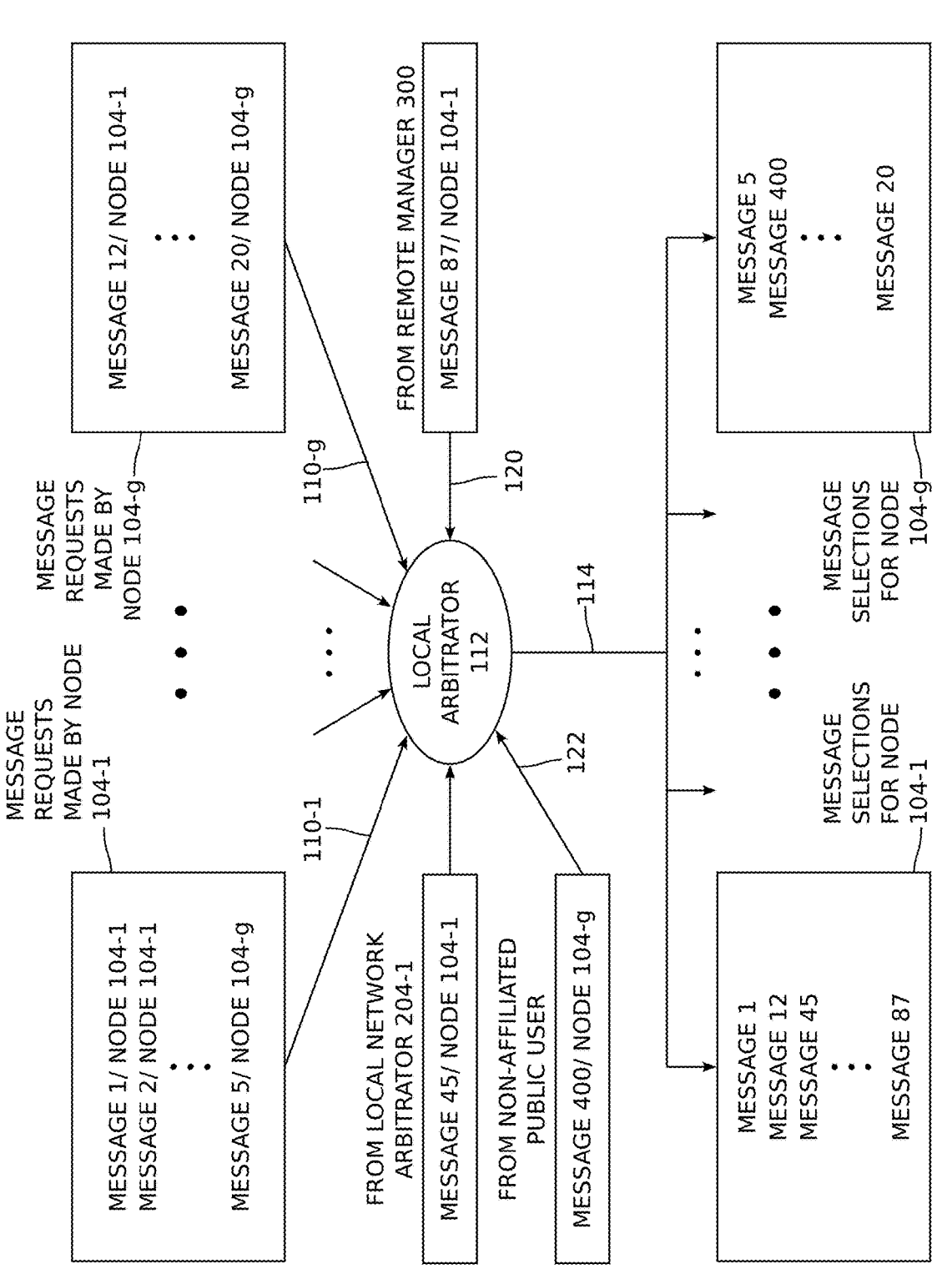

FIG. 1A is a schematic block diagram of a system for local network public notification negotiation and FIG. 1B depicts the mechanics of an exemplary local network selection decision. The system 100 comprises a local network 102 comprising a plurality of neighborhood media nodes 104-1 through 104-g, where g is an integer greater than one. Some examples of a neighborhood media node include a portable kiosk, a mobile kiosk, a permanently stationary kiosk, a planar sign (i.e., mounted on a wall or in a window), or a display mounted on an automotive vehicle, a drone mounted display, or even a boat mounted display. As used herein a "permanently stationary kiosk" is understood to include billboards, including bulletin, 30 sheet (poster), 8 sheet (junior poster), and even spectacular sized billboards, as well as bus shelters and transit boards. Automotive vehicles are understood to include cars with roof-mounted toppers, projectors, side-mounted displays, as well as truck billboards to name a few examples. Each neighborhood media node is configured to project a plurality of n media message per a first time period to a general public, where n is an integer greater than or equal to one. As an example, neighborhood media node 104-1 is shown presenting media message projections, as represented by reference designators 106-1 through 106-n. At least one user interface (UI) 108 is assigned to the neighborhood media nodes. The UI 108 has an inputs on line 110-1 through 110-g, respectively corresponding to the media nodes 104-1 through 104-g, for entering local network program choices including neighborhood media node selections cross-referenced to media message selections. FIG. 1A shows the UIs directly connected to the local arbitrator 112 but, alternatively, the UIs may be independent and directly connected to media nodes and, thus, indirectly to a local arbitrator 112. Although the drawing may imply that the UI 108 is a particular communication device, it should be understood that the UI represents any means of accessing the local network 102, corresponding neighborhood media nodes 104-1 through 104-*g*, or the local arbitrator 112. For example, the UI may be a personal computer keyboard or smartphone with a browser, or mobile phone application that enables communications with a local network/local arbitrator website. As is conventional, the UI may include a video display, keypad, microphone, camera, mouse, audio speaker, stylus, and touchscreen, to name a few examples of accepting user input and presenting output. Although the drawing implies that all communications to the neighborhood media nodes 104-1 through 104-*g* occur through the local arbitrator 112, in some aspects UIs connected to the media nodes can be used to upload media messages and program requests directly to neighborhood media nodes and/or to the local arbitrator 112. In some aspects the local arbitrator 112 may screen messages for veracity, public decency, public utility, value, and/or agreed upon standards.

A local network may be comprised of media nodes in close proximity to each other or media nodes intended to display a similar type of message. The media nodes in a local network may be owned or managed by a common entity, but that is not required. Media node membership to a particular local network is limited and requires the establishment of a relationship between nodes and/or registration with a respective local network arbitrator. Membership in a local network may require a vetting process.

New media messages can be added or updated via the media nodes 104-1 through 104-*g* or the local arbitrator 112, and can be stored at the media nodes or with the local arbitrator. In one aspect, media messages entered via a media node are relayed to the local arbitrator for organization and vetting, even if the messages entered via a particular media node are to be projected from that same particular media node by which they were entered. In some aspects only entities associated with a media node are allowed to enter program choices or upload media messages. Association with a media node may entail belonging to a local network organization, owning a media node, or managing and/or maintaining a media mode on behalf of the media node owner. In this case, proof of media node association may be required, such as a password to access the local network arbitrator or a media node. Alternatively, members of general public not explicitly affiliated with the local network may be invited to make program choices and/or upload media messages through a UI on line 122. As used herein, the "general public" is an entity or entities that do not own or manage the local networks or media nodes, and that do not necessarily have any type of preferred relationship with the networks or media nodes. Providing network access to the general public is service that gives the public an efficient communications means, and a method of expression for local scale information dissemination. For example, a member of the general public may use the media nodes in a local network to distribute a notice and picture of their lost dog.

In the case of general public access, personal identification may be required, and the message uploads subjected to screening. For example, a member of the general public may download a mobile phone application to their smartphone that enables communications with the local network. Communications can also be enabled via a local network website or directly via a media node UI. Once personal information is entered to verify identity of a non-affiliated member of the general public and local network conditions and rules are acknowledged, some access may be granted to the media nodes. These general public media messages may be considered a type of home-neighborhood media message, as explained in more detail below.

The local arbitrator 112 associated with the local network 102 may be enabled as a computer server and has inputs on lines 110-1 through 110-*g* to accept the local network program choices. In some aspects, the managers of particular neighborhood media control maintain at least some direct control over the media messages projected by their own media nodes, but otherwise the local arbitrator may organize the messages to be projected by the neighborhood media nodes 104-1 through 104-*g* in the local network 102. This organization can be enabled in the form of a local network selection decision presented to the neighborhood media nodes 104-1 through 104-*g* on line 114. The local arbitrator 112 arranges the media messages presented in the local network program choices and resolves conflicts, if necessary, to create the local network selection decision. The neighborhood media nodes 104-1 through 104-*g* project media messages in response to the local network selection decision on line 114. Communications between the arbitrator and media nodes may be via an Ethernet interface, but more likely wirelessly, via a WiFi, cellular, or Bluetooth interface for example.

Typically, each neighborhood media node 104-1 through 104-*g* comprises a communication subsystem and the local arbitrator 112 also comprises a communications subsystem (see FIG. 5) to supply the local network selection decision to the neighborhood media nodes 104-1 through 104-*g*. The communications subsystems may be enabled via wireless (e.g., cellular) links but, in some aspects, part or all of the communications may be enabled using Ethernet and fiber optics Internet or Intranet links, as would be well known in the art.

For example, media nodes effectively create an Internet/Intranet connection when they establish a virtual private network (VPN) between embedded computers and a remote arbitrator host. In a VPN scenario, a user may also initiate a connection to a known network media node or arbitrator host. Following some method of authentication, a connection is established where the UI (computer) receives an Internet Protocol (IP) address for the Internal network, from the host. Once the connection is complete, the computer thereafter operates as if it was in the same Intranet. This effectively extends a local network to each VPN client as if they too were in the Intranet. The same methodology can also be applied to servers, routers, and other devices, to create a very large Intranet between buildings in a neighborhood, or even within different cities, states, and even continents.

In one aspect, the local arbitrator 112 optionally accepts remote media messages supplied by a remote network source on line 120, which is external to the local network 102. Then, the local arbitrator 112 supplies a local network selection decision including a combination of neighborhood media messages and remote media messages, cross-referenced to neighborhood media nodes. The local arbitrator 112 may supply a decision on line 114 selecting a maximum number of p neighborhood media messages per first time period for each neighborhood media node, where p is an integer less than or equal to n. For example, neighborhood media node 104-1 is shown presenting neighborhood media message projections 106-1 through 106-2, respectively, messages 1 and 12 (see FIG. 1B).

In more detail, requests by local neighborhood users can be organized in two different categories: home-neighborhood media messages and inter-neighborhood media messages. A neighborhood media message explicitly associated with a neighborhood media node 104-1 is considered a home-neighborhood media message with respect to the neighborhood media node 104-1. This applies to the case where the manager of neighborhood media node 104-1 seeks to put a public notice of their choosing or a notice closely associated with their media node, for projection on their own media node, e.g., projection 106-1, message 1. Media messages entered by local network non-affiliated general public members may also be considered as a type of home-neighborhood media message, e.g., projection 106-z, message 400. The local arbitrator 112 may supply a decision on line 114 selecting a maximum number of t home-neighborhood media messages and a minimum number of q home-neighborhood media messages for each neighborhood media node per first time period, where t is an integer less than or equal to n, and q is less than or equal to t. In this example, q is equal to 2 for media node 104-1.

Otherwise, a neighborhood media message explicitly associated with a second neighborhood media node is considered an inter-neighborhood media message with respect to a first neighborhood media node. This is the case where the manager of neighborhood media node 104-2 seeks to put a public notice of their choosing on neighborhood media node 104-1, projection 106-2, message 12. For example, the neighborhood media message may be notice of an event being hosted at or near media node 104-2. Thus, the local arbitrator 112 may supply a local network selection decision on line 114 selecting a maximum number of r inter-neighborhood media messages for each neighborhood media node, where r is an integer less than or equal to n. In this example, r=1 for media node 104-1.

Figures 2A, 2B:
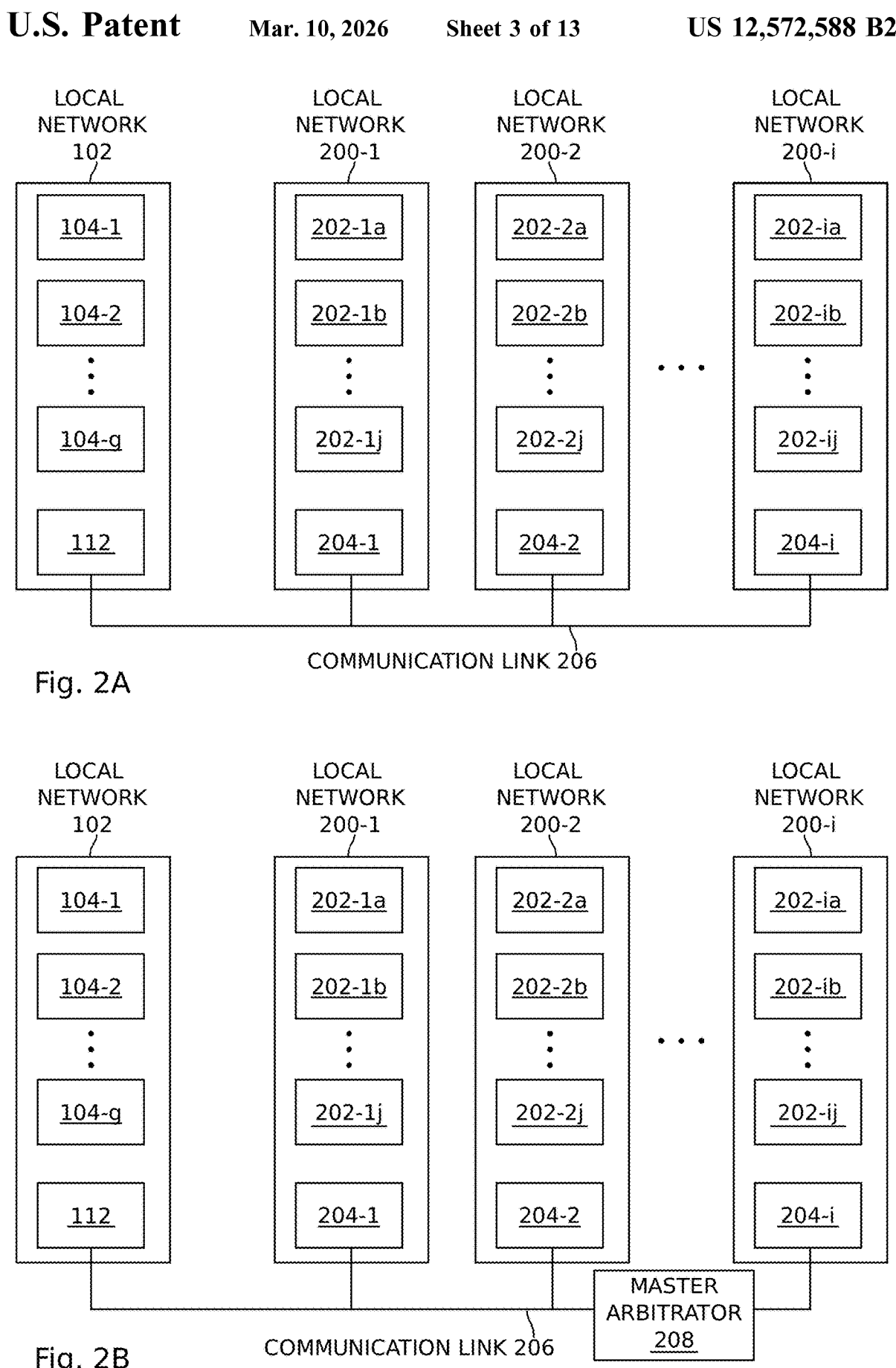
FIG. 2A and FIG. 2B are schematic block diagrams of a system comprising a plurality of local networks with corresponding neighborhood media nodes.

FIGS. 2A and 2B are schematic block diagrams of a system comprising a plurality of local networks with corresponding neighborhood media nodes. Shown are local networks 102 and 200-1 through 200-i, where i is an integer greater than one. Each local network comprises neighborhood media nodes, as described above. Shown are j number of neighborhood network nodes 202 for each local network, where j is an integer greater than or equal to one. For example, local network 200-1 comprises network nodes 202-1a through 202-1j. Note: the local networks 200-1 through 200-i need not necessarily comprise the same number of neighborhood media nodes (as depicted). Local arbitrators 204-1 through 204-i, as described above, are respectively associated with local network 200-1 through 200-i. In one aspect requests can come from users in other local networks, e.g., a local network associated with a nearby neighborhood. A neighborhood media message explicitly associated with local network 200-1 (e.g., 202-1b) or a neighborhood media node (e.g., 202-2a) in local network 200-2 is considered an intra-local media message with respect to a local network 102 neighborhood media node. The term "media message explicitly associated with" is intended to describe a relationship such as the message being supplied by the media node owner or manager, or being supplied by an entity having a preferred relationship with a local network or media node in a local network, as acknowledged by the local arbitrator. It would also be possible for a member of the general public to present messages in a first local network, with access gained via a second local network, provided the user has established a relationship with the second local network or a media node in the second local network, at least for a particular message.

The local arbitrators 112 and 204-1 through 204-i are connected via communication line 206 and intra-local media messages requests are presented via this (wireless or wired) interface. The local network arbitrator 112 arranges neighborhood and intra-local messages for projection by media nodes in local network 102, and may resolve conflicts, if any, between intra-local and neighborhood requests within local network 102. In this case the local arbitrator 112 of FIG. 2A may supply a local network selection decision selecting a maximum number of s intra-local media messages for each neighbor media node, where s is an integer less than or equal to n. Alternatively, as shown in FIG. 2B, a master arbitrator 208 may supply the local network decision for each local network. In some aspects the master arbitrator 208 may screen messages for veracity, public decency, public utility, value, and/or agreed upon standards.

Figure 3:
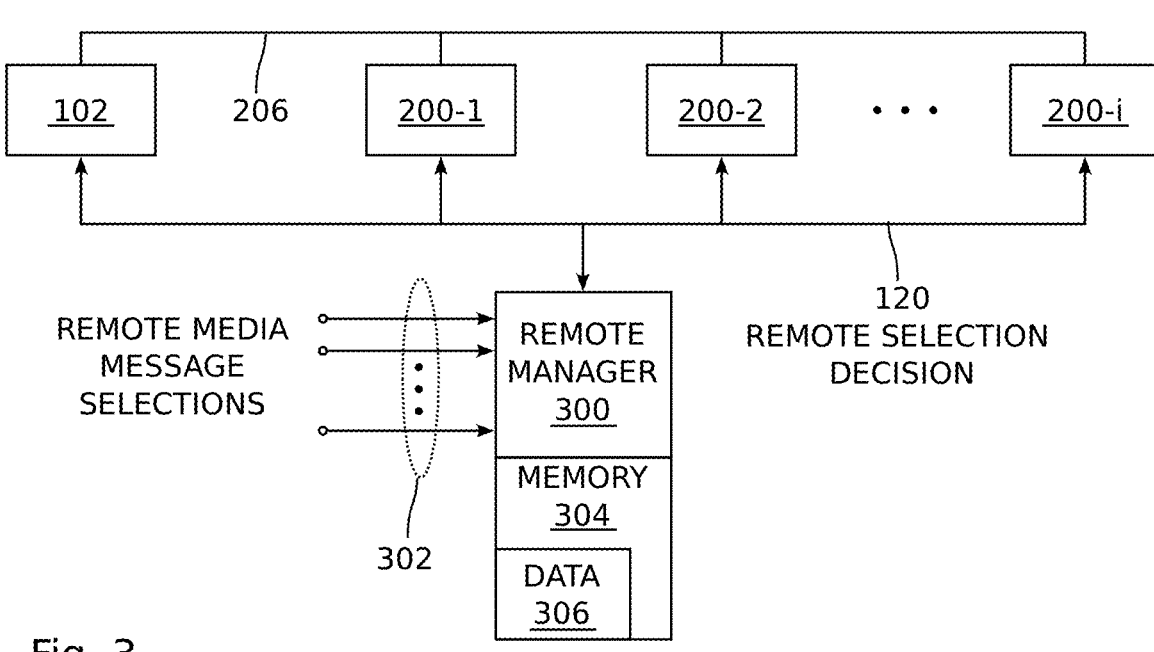
FIG. 3 is a diagram depicting a system comprising local control of remote media messages.

As shown in FIG. 1A, neighborhood media node 104-1 supplies intra-local media message projection 106-3 (message 45). Thus, in this example, s is greater than or equal to one for node 104-1. Each local network 102 neighborhood media node (e.g., node 104-1) is configured to project home and inter-neighborhood media messages, intra-local media messages, and combinations thereof. It is possible that the values of s, n, t, q, p and r may vary between different media nodes and between local networks FIG. 3 is a diagram depicting a system comprising local control of remote media messages. A remote manager 300 has an input on line 302 to accept remote media messages and an output on line 304 to supply a remote selection decision, including selected remote media messages, which are sent to the local network arbitrator on line 120. For example, the remote manager 300 may receive remote media messages in the form of weather predictions for all the regions of the nation and elections results from many districts. In turn, the remote manager 300 may choose weather predictions and election results that are local to the local network 102 neighborhood. The remote manager 300 may filter and/or resolve conflicts between messages to be included as part of the remote selection decision. However in this example, as explained above, the local arbitrators resolve conflicts between the projection of neighborhood, intra-local, and remote media messages. The remote manager 300 may also receive feedback from the connected local networks on line 120. The local networks may supply acknowledgment of the receipt and projection of remote media messages, and well as a record of local (neighborhood and intra-local) media messages being projected. Further, the remote manager may receive and store in a non-transitory memory 304 data file 306, information collected by the media nodes sensors and network UIs, as well as data concerning users accessing any media nodes services in an effort to more accurately characterize the neighborhoods and neighborhood residents within the local networks. Although not explicitly shown, alternatively the master arbitrator of FIG. 2B may resolve conflicts between the remote manager and the local arbitrators.

In greater detail FIG. 1B depicts program choices presented in affiliation with media nodes 104-1 and 104-g. Selections affiliated with node 104-1 include requests for messages 1 and 2 by node 104-1, and message 5 by node 104-g. Selections affiliated with node 104-g include requests for message 12 by node 104-1 and message 20 by node 104-g. The local arbitrator also receives a request from local arbitrator 204-1 for the projection of message 45 at node 104-1, a request from a general public member on line 122 for the projection of message 400 at node 104-g, and a request from the remote manager on line 120 for the projection of message 87 at node 104-1. The local arbitrator 112 supplies a local network selection decision on line 114 directing node 104-1 to project messages 1, 12, 45, and 87 (but not message 2) and directing node 104-g to project messages 5, 400, and 200. Note: the message requests and projection directions (selection decision) are referenced to one particular duration of time. Only a single time duration is described in the interest of clarity, but it should be understood and the requests and selection decisions may be made iteratively and/or change over time.

Figure 4:
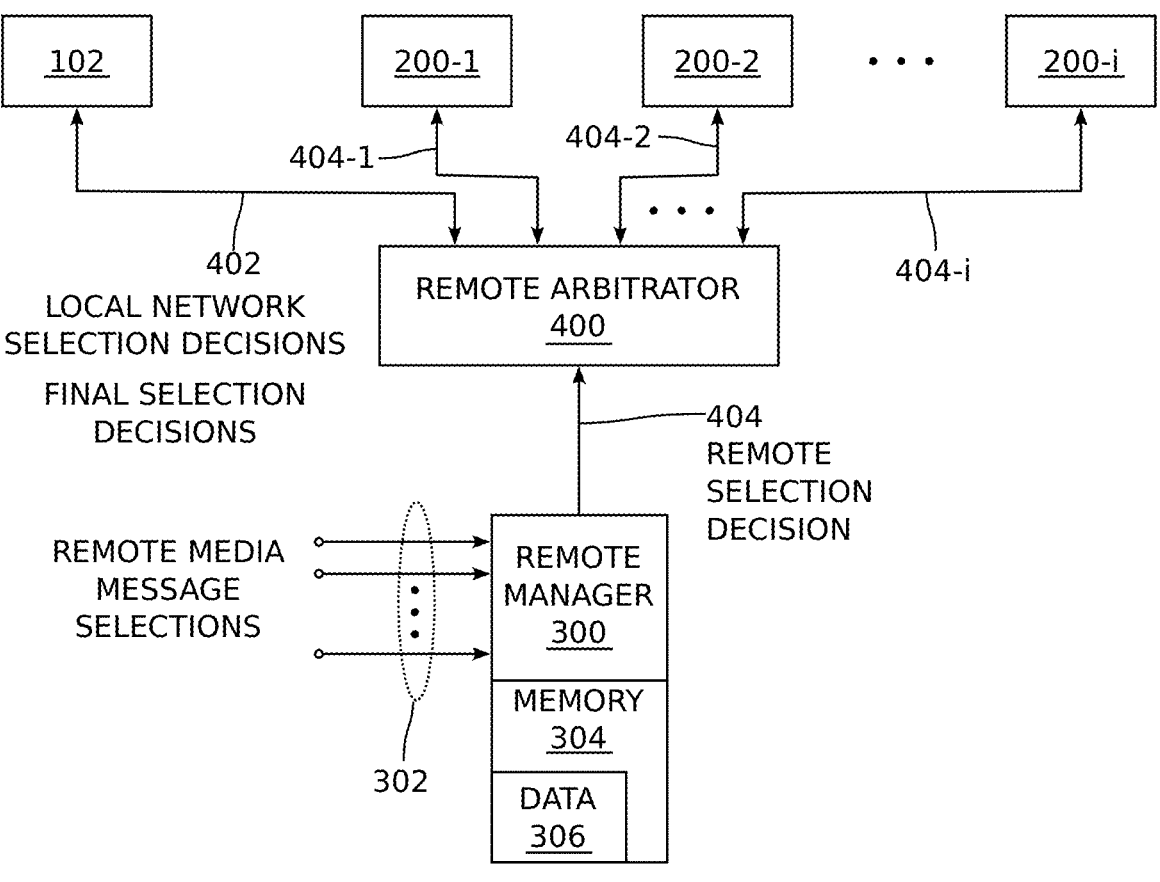
FIG. 4 is a diagram depicting a system comprising remote control of remote media messages.

FIG. 4 is a diagram depicting a system comprising remote control of remote media messages. As in FIG. 3, this system comprises a remote manager 300. In some aspects the remote manager 300 of FIG. 3 or 4 may screen messages for veracity, public decency, public utility, value, and/or agreed upon standards.

The system further comprises a remote arbitrator 400 having an interface to accept the local network selection decision on lines 402 and 404-1 through 404-i, respectively, from local networks 102, 202-1, 202-2, and 202-i, and the remote selection decision on line 404. The remote arbitrator arranges messages associated with both the local networks and remote message selections, resolves, if necessary, conflicts between the local selection decisions and the remote selection decision, and supplies a final selection decision on lines 402 and 404-1 through 404-i. In some aspects the remote arbitrator 400 may screen messages for veracity, public decency, public utility, value, and/or agreed upon standards.

As noted above, the local selection decision for each local network includes, at least initially, determination of a combination of home-neighborhood media messages, inter-neighborhood media messages, and intra-local media messages, and the final selection decision adds remote messages to the mix. For example, the remote arbitrator 400 may select a maximum number of m neighborhood media messages per first time period for each neighborhood media node, where m is an integer less than or equal to n. As above, the remote manager 300 may also receive feedback from the connected local networks. The local networks may supply acknowledgment of the receipt and projection of remote media messages, and well as a record of local (neighborhood and intra-local) media messages being projected. Further, the remote manager may receive and store in a non-transitory memory 304 data file 306, information collected by media node sensors, UIs, as well as data concerning users accessing the media node services in an effort to more accurately characterize the neighborhoods and neighborhood residents within the local networks.

Figure 5:
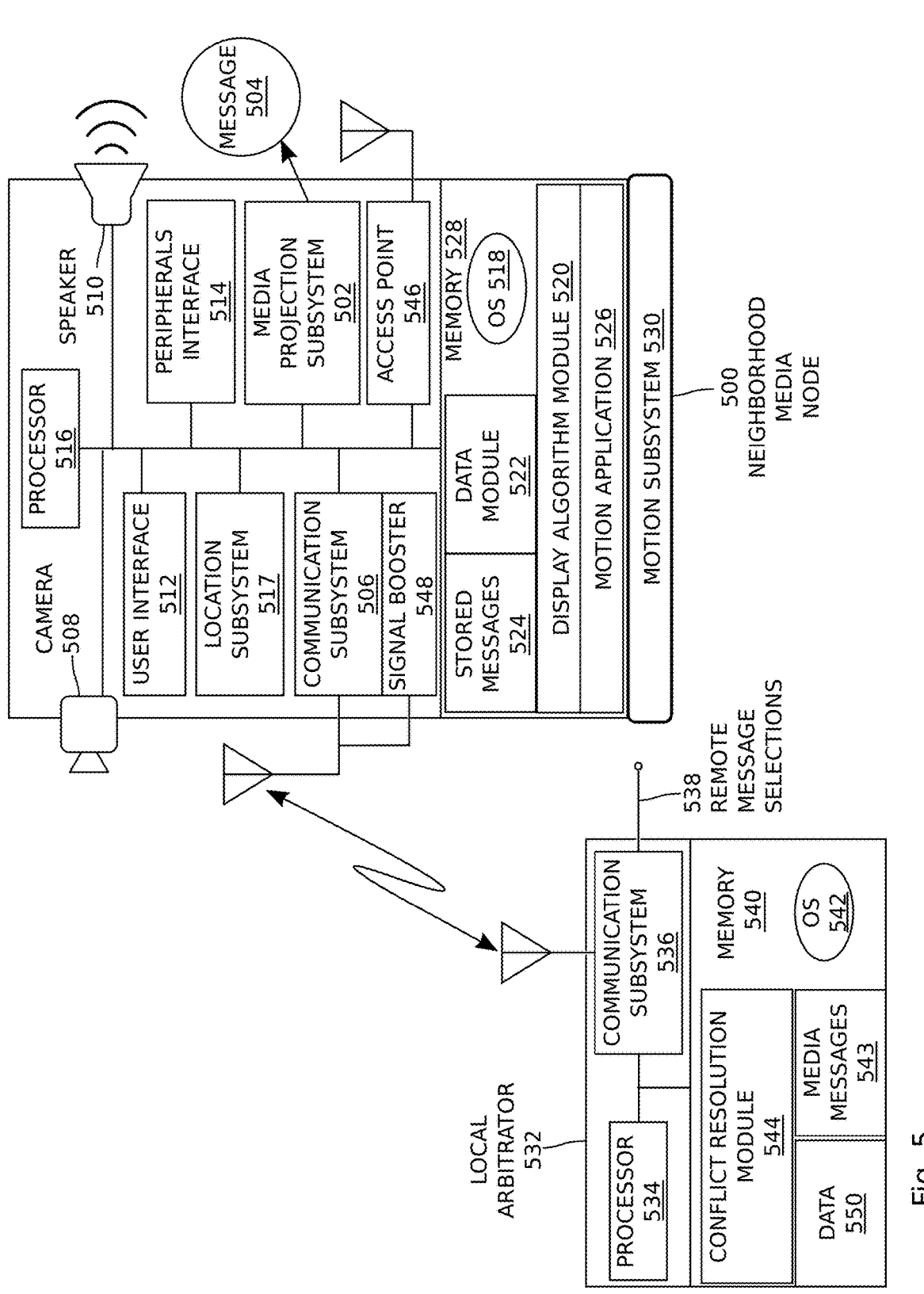
FIG. 5 is a schematic block diagram depicting a neighborhood media node and local arbitrator enabled with computer components.

FIG. 5 is a schematic block diagram depicting a neighborhood media node and local arbitrator enabled with computer components. As is conventional, various components in the devices described above might comprise a processor, an operating system (OS), and processor executable software modules needed to performed the above-described functions that are stored in a non-transitory memory. Neighborhood media unit 500 therefore comprises a media projection subsystem (MPS) 502 to project messages, as represented with reference designator 504, and a communications subsystem 506. The communications subsystem 506 is shown enabled as wireless in this example, but the media node could alternatively be enabled with a hardwire linkage. Optionally, the media node 500 may further comprise a camera 508, audio speaker 510, UI 512, and peripherals interface 514. The UI 512 may be used by the media node manager to enter local network program choices, or used by a non-affiliated passerby to request additional information concerning a projected message, request the presentation of an uploaded message, or to use other communication services offered by the media node. An optional location subsystem 517 is also shown. Devices (not shown) may be included that are applicable to autonomous movement, such as a motion detector, ultrasonic detector, photodetector, LIDAR, and Radar.

Details of the media node 500 enabled as a kiosk, automotive vehicles, and aerial drone are provided in parent applications: U.S. Pat. Nos. 10,796,340, 10,803,488, 10,991, 007, 11,037,199, 11,138,634, 11,055,743, Ser. No. 17/316, 156, U.S. Pat. Nos. 11,138,635, 11,138,636, Ser. No. 17/097, 256, U.S. Pat. Nos. 11,278,900, 11,257,120, Ser. No. 17/168, 313, U.S. Pat. No. 11,270,349, Ser. No. 17/687,031, Ser. No. 17/830,412, Ser. No. 17/830,783, Ser. No. 17/962,513, and Ser. No. 17/983,545, which are incorporated herein by reference.

Processor 516 is operatively connected to the OS module 518 and display algorithm module 520, as well as optional data module 522, stored message module 524, and autonomous motion module 626 in memory 528. In some aspects, the media node is capable of manual or autonomous motion as represented by motion subsystem 530. Local arbitrator 532 typically comprises a processor 534 and communications subsystem 536 to interface with neighborhood media nodes, as shown for example using a wireless medium, and optionally to receive remote message selections, as shown for example using a hardline 538. Local arbitrator memory 540 includes an OS 542, message storage module 543, data storage file 550, and a conflict resolution module 544. The conflict resolution module 544 organizes the media messages being projected in the local network, and resolves conflicts in the event that the same resource cannot be shared as requested. Sensors on the media nodes may be used to collect local environment data, as described in parent application Ser. No. 17/983,545 for example, which can be stored in memory as data or reported back to the local arbitrator. One example of an environmental sensor is camera 508. Other components (not shown) may include a microphone, weather sensor, odor sensor, photodetector, chemical sensor, a wireless spectrum receiver, a wireless service traffic analyzer, radiation sensor, and air quality monitor.

Figure 6A:
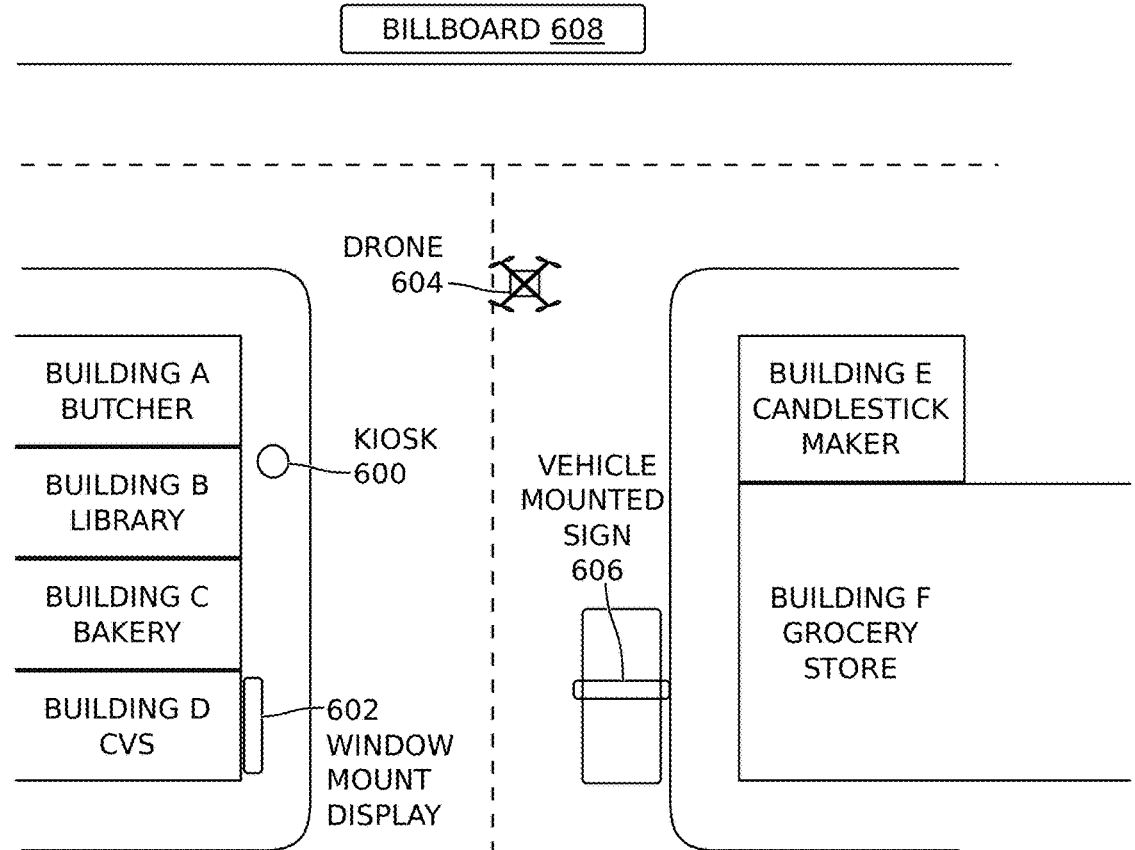
Figure 6B:
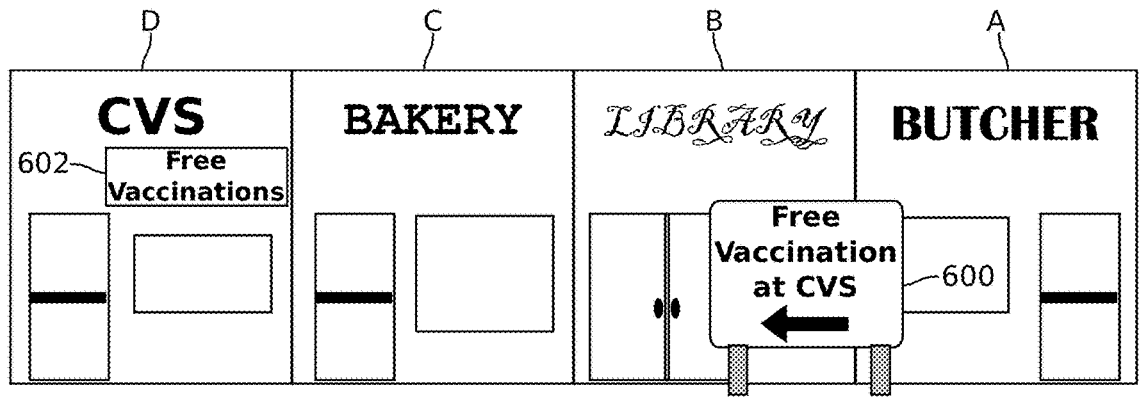
FIG. 6B through FIG. 6D are perspective views of the local network over a first duration of time.
Figure 6C:
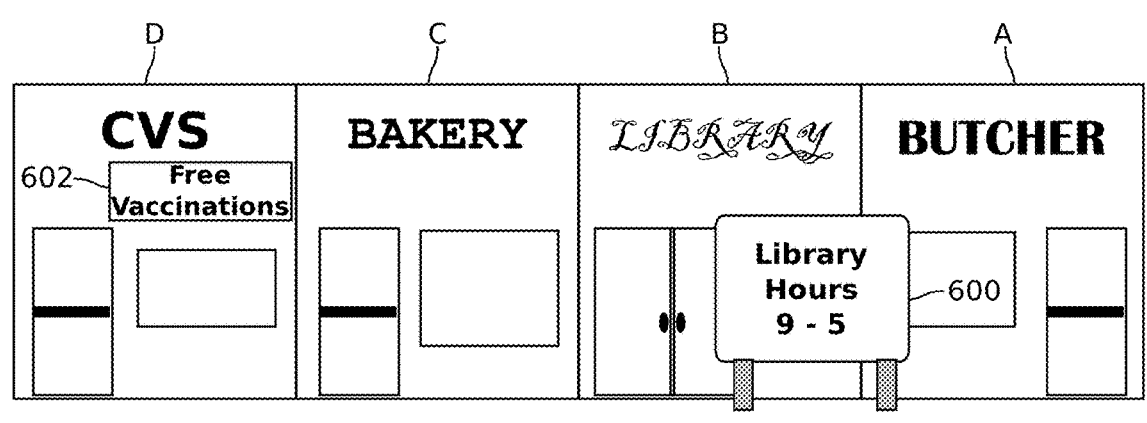
Figure 6D:
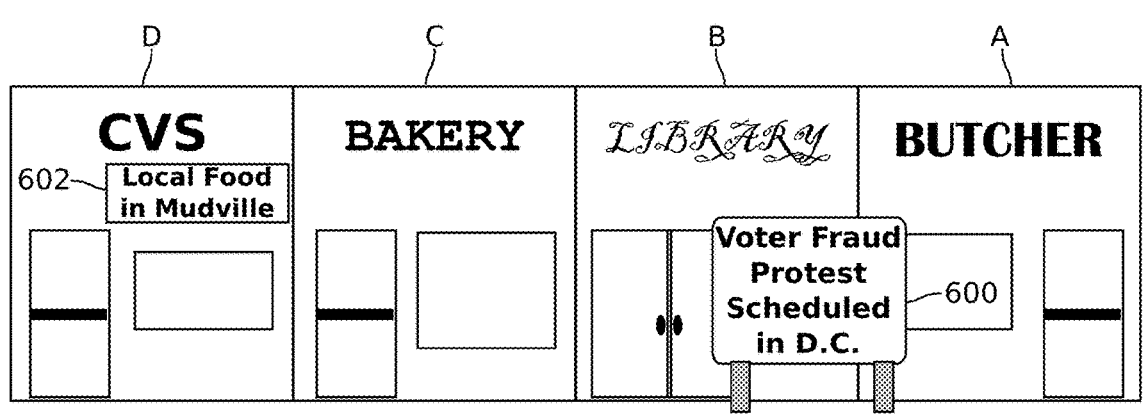
Figure 8C:
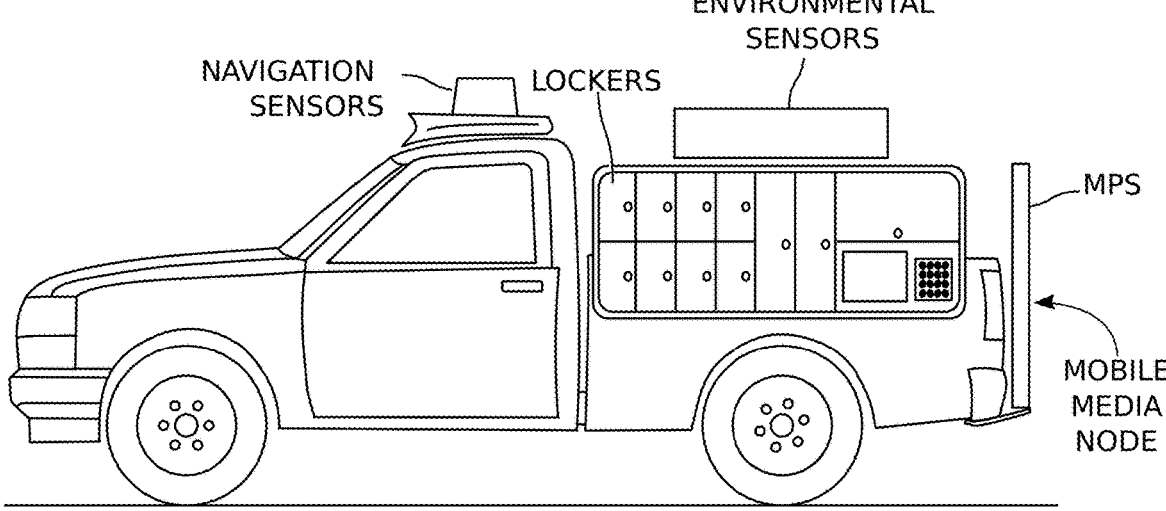
FIG. 8A through FIG. 8L depict some examples of neighborhood media nodes.

FIG. 6A is a plan view example of a local network with neighborhood media nodes, while FIGS. 6B through 6D are perspective views of the local network over a first duration of time. FIG. 6A depicts neighborhood media nodes enabled as a sidewalk kiosk 600, a window-mounted sign 602, an aircraft drone 604, an automotive-mounted sign 606, and a billboard 608. In FIG. 6B the kiosk 600 in front of the library (building B) projects an inter-neighborhood media message that the CVS pharmacy (building D) is offering free vaccinations. The window-mounted sign 602 at the CVS displays the same message, which from the perspective of the CVS is a home-neighborhood media message. In an effort to encourage vaccinations, a smartphone camera or a dedicated in-premise camera linked to the local network may be used to display in media nodes 600 and/or 602 a real-time video depicting the length of the line of people waiting for vaccinations. Images may also be projected of people previously vaccinated to show proof of vaccination to the general public, for example, that vaccinations are painless. These images may also be stored as proof that a particular person was in the premise at a certain time, or as data to more accurately characterize a neighborhood and its denizens.

In FIG. 6C the kiosk 600 in front of the library (building B) projects a home-neighborhood media message showing the library hours while the window-mounted sign 602 at the CVS continues to display the home-neighborhood media message (free vaccinations). In FIG. 6D the kiosk 600 in front of the library (building B) projects a remote media message concerning national politics, while the window-mounted sign 602 at the CVS displays an intra-local message concerning flood warnings in the nearby town of Mudville.

It should be understood that the system is able to capture real-time events, and well as enable pre-recorded messages. In one example, outdoor stationary or mobile media nodes may be enabled to show a speech occurring within one of the buildings, in the event that the building is too small to accommodate all the attendees. These media nodes may be located immediately outside the building, at other locations in the area of the local network, or at locations in other local networks. In another example, an outdoor camera can be mounted on buildings to capture the population density or traffic conditions around a particular facility, which can then be displayed on media nodes in the local network or in neighboring local networks. The media nodes may also be equipped with sensors (e.g., cameras and microphones) that are able to capture information concerning proximate pedestrians and traffic that can be stored and shared in an effort to more accurately characterize neighborhoods.

In another aspect, the media nodes themselves may be the source of media messages projected from their own displays (i.e., a type of "selfie") or other media nodes in the local network. In one example, a camera mounted on a media node may be used as a proof of attendance to a particular location, or a form of neighborhood watch protection service, keeping a real-time video record of proximate events and people. People could also access this stored video record through the media node or associated local arbitrator, to prove their attendance at a certain location at a certain time, or even arrange the recording media node or associated local arbitrator to send the appropriate video, tagged with geographic position data, local landmarks, or local event identifiers, to a social media site, text number, or email address. Alternatively, images can be uploaded from social media sites or cells phone memory for presentation on one or more media nodes, as a type of personal identification for example. As noted above, access to the local network and particular media nodes may be granted through a browser or phone application.

Some locations in the neighborhood may be weighted to have a greater value than other locations. For example, locations that have greater foot traffic or greater visibility may have more value. Further, mobile or portable media nodes may have a value weighted on whether they are stationary, the duration of time they are stationary, and their ability to report their stationary status to the local arbitrator. The local arbitrator or the media nodes themselves may be loaded with targeting software module (not shown) that can be used to direct the media nodes to advantageous locations. In the case of an airborne vehicle, "parking" may be understood to be maintaining an approximate location in midair, as well as a landing location. In the case of air or nautical media nodes, the launching site, landing site, or midair position may be the stationary or parking location. Even non-mobile media nodes may have location devices, and use their communication subsystems to verify their location, that fact that they are projecting messages, or the specific messages being projected cross-referenced to time.

A "stationary location" may be a parking location. "Parking" is typically understood to be location where a vehicle media node is temporarily left with its engine off, or if not self-powered, left without means of movement. Vehicles or mobile media nodes may be "parked" along city streets, on sidewalks, in stores and publically accessible buildings or in publicly accessible areas, such as parking lots. Mobile media nodes are typically "parked" for limited durations of time, typically a matter of hours, but the durations can be as small as minutes or larger than even weeks. "Temporary" is understood to typically be a duration of several minutes to several hours, although it may also be a matter of days or even weeks. "Occupation" is understood to mean filling a space or location so completely that another vehicle or entity is unable to fill that space. In the case of drone aircraft or boat media nodes, these vehicles may need to be powered with engines running to maintain a stationary location.

Weighted values can be established using geofencing services, such as provided by Radar Labs, Inc. Geofencing uses technologies like Global Positioning Satellite (GPS), Global Navigation System (GNSS), radio frequency identification (RFID), WiFi, cellular data, and Internet Protocol (IP) address ranges, to build virtual fences in geographic regions. These virtual fences can be used to track the physical location of a device (e.g., smartphone) active in the particular region or the fence area. The location of the person using the device is taken as geocoding data and can be used to construct a picture of Internet Protocol (IP) traffic in those areas. Sensors on the media nodes can also be used to collect data that can be used to support and update geofences.

Referring back to FIG. 5, the media projection subsystem (MPS) 502 may be a light emitting diode (LED) or liquid crystal (LC) display, a sidewalk or wallscape image projector, a retractable screen, a topper, holographic display, electroluminescent (EL) display, switchable glass displays, persistent image fan, or combinations thereof. An image projector may be enabled as a LC or LED display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. In other words, the MPS 502 may present a 2-dimensional or 3-dimensional image, which may or may not be transitory. Transitory images include a series of still images, videos, or combinations thereof. The media node may also broadcast audio messages, or a combination for audio and visual messages.

The media node may further comprise a publically accessible access point (AP) 546, such as an IEEE 802.11 Wireless Local Area Network (WLAN) AP, an IEEE 802.15 Wireless Personal Area Network (WPAN) AP, and combinations thereof. In this case the communications subsystem 506 may enable AP data traffic via a communications subsystem cellular network. Alternatively, the AP 546 may act as the communications subsystem, especially if the local arbitrator is located nearby. Less common, the access point may an IEEE 802.15.4 Zigbee, WPAN IEEE 802.15 Li-Fi or wireless USB device. Even more unlikely as an access point are Long Range Wireless systems. As used herein, a "publically accessible" system is a system that can be accessed by the general public without a password or similar security measures, or where the password is publically distributed. One example of a publically accessible AP is the WiFi hotspot service provided by a typical Starbucks coffee shop. In the case of a password being required for access, the password may be printed on the mobile platform, displayed by the media projection subsystem, or made available through a media projection phone application or website.

Examples of a location subsystem 519 include a Global Positioning Satellite (GPS) system receiver, Global Navigation System (GNSS), assisted GPS or GNSS taking advantage of cell tower data, a Wireless Local Area Network IEEE 802.11 (WiFi) positioning system, cell-site multilateration (e.g., Skyhook), satellite multilateration, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796, 340, which is incorporated herein by reference, camera images and the location data of proximate smartphones, laptops, and personal communication devices can also be used to determine location.

The most typical examples of the communications subsystem 506 are wireless cellular systems (e.g., Global System for Mobile Communications (GSM), Universal Mobile Telecommunications System (UMTS)-time division duplexing (TDD), Long-Term Evolution (LTE), $4^{th}$ Generation (4G), or $5^{th}$ Generation (5G)), and the like. Less typically, the communications subsystems may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, StarLink, and IEEE 802.16 Worldwide Interoperability for Microwave Access (WiMAX (WiBro)). The system 100 is not limited to any particular type of communication subsystem. For simplicity, FIG. 5 depicts a direct wireless communications subsystem 506 connected to the local arbitrator 532. However, it should be understood that a typical cellular link includes intervening base station and hardline connections.

In one aspect, the access point 546 and/or communications subsystem 506 can be used to collect data from entities passing by, or engaging with the access point or using the communications subsystem. This data can be stored in local memory data storage module 522 for subsequent recovery or transmission to the local arbitrator and/or remote manager in support of data gathering or geofencing data. In support of data collection, the access point is publically accessible to user devices that include smartphones, personal devices, or generally any type of computing device. Typically, the user devices are enabled for WiFi and Bluetooth communications. If left enabled, as is the typical case for many users, the user device is able to interact with a nearby access point even if a communication data link is not established. As used herein, the term data collection or data mapping includes the collection of data from the user devices. In one aspect, user data information (e.g., addresses) is collected voluntarily, with the user explicitly agreeing to data collection in response to an access point provided services, such as the provision of an Internet browser, email, Internet, social media services, or smartphone applications.

The system 100 may include a signal booster 548, such as a device provided by WeBoost, or a similarly functioning proprietary device. The signal booster 548 may be independent or, as shown, may use the communications subsystem 506. The booster 548 may act as a relay between a proximately located user cellular device and a cellular network (i.e., base station or satellite). In other aspects, a signal booster 548 acts to relay Internet signals, such as might be useful when employed with the StarLink or similar Internet service, as the StarLink ground units require an uninterrupted view of the sky (i.e., view of the StarLink satellites).

As used herein, an "entity" or "user" may be a person, a business, a corporation, any type of social organization or business unit, a physical device, or a software application. For simplicity, the entities may be identified as the hardware components being used by, or associated with a business, person, corporation, or social organization. In this case, the entity may be described as a computer, smartphone, media projection subsystem, server, or vehicle, to name a few examples.

Figure 7:
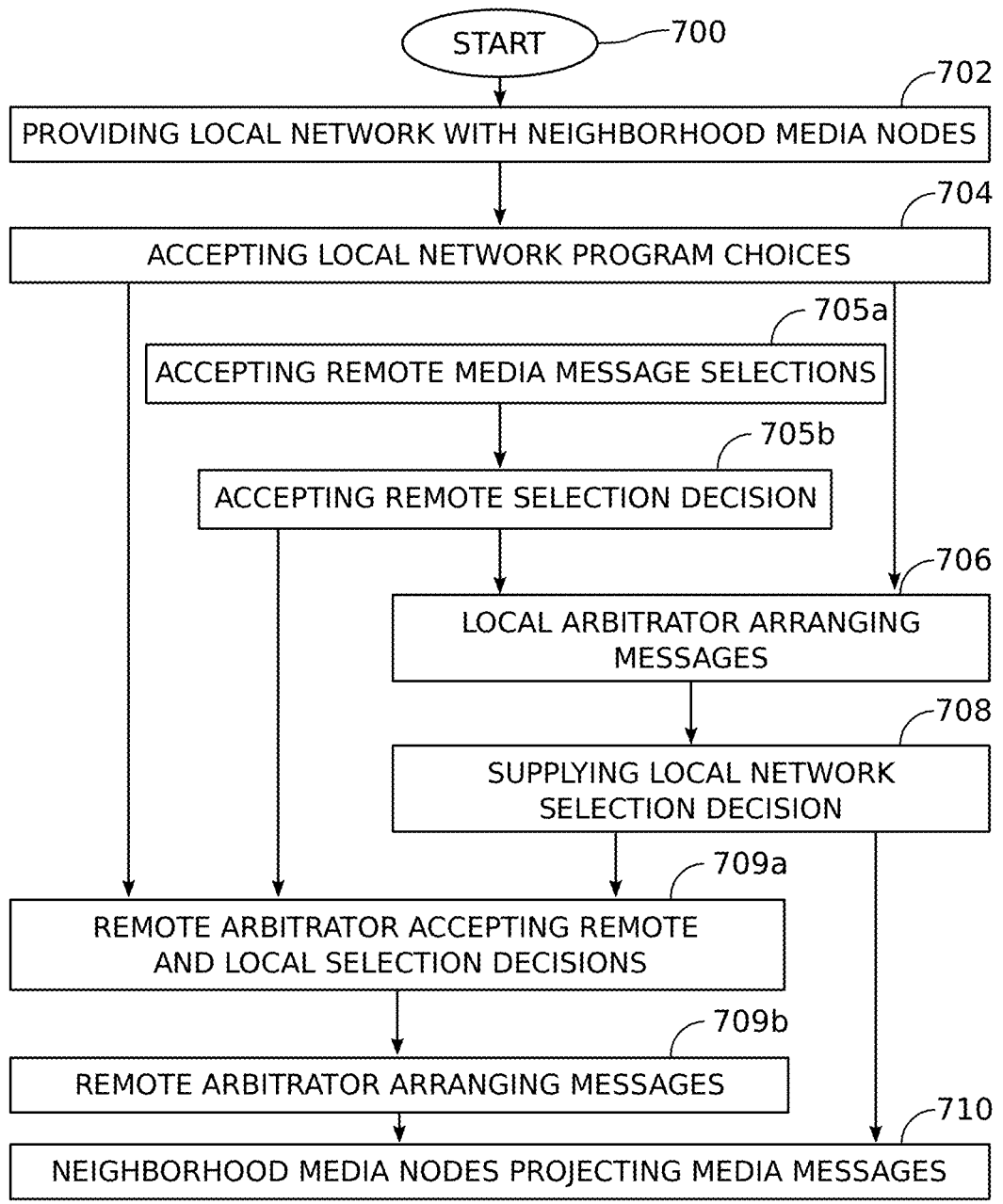
FIG. 7 is a flowchart illustrating a method for local network public notification negotiation.
Figure 8A:
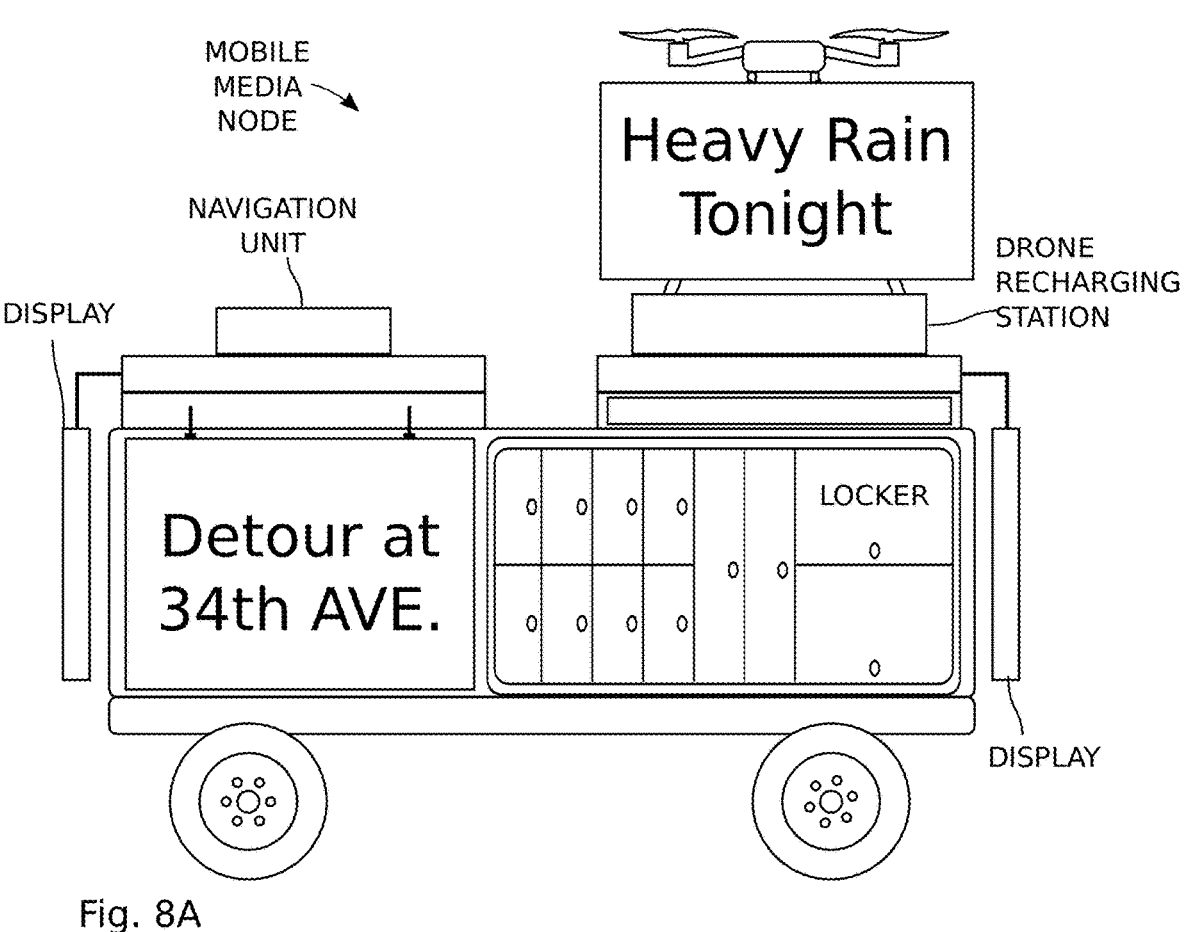
Figure 8B:
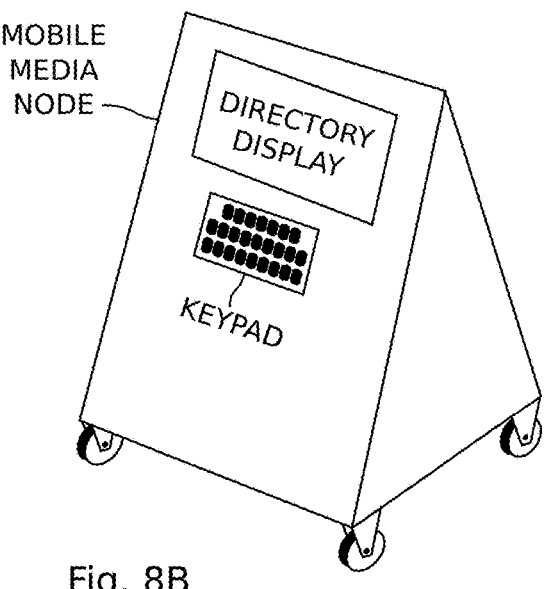
Figure 8E:
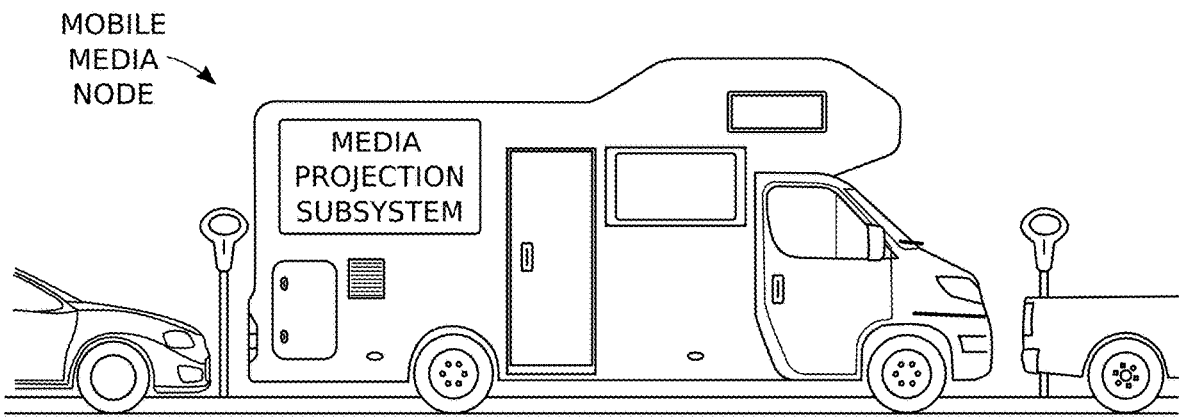
Figure 8F:
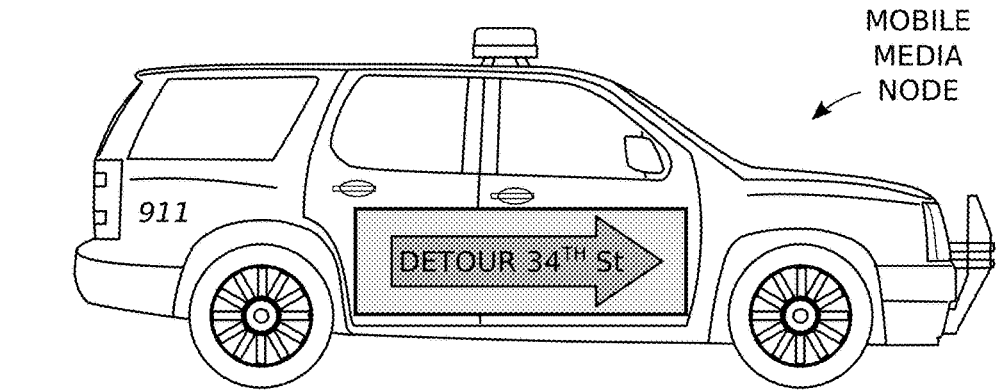
Figure 8G:
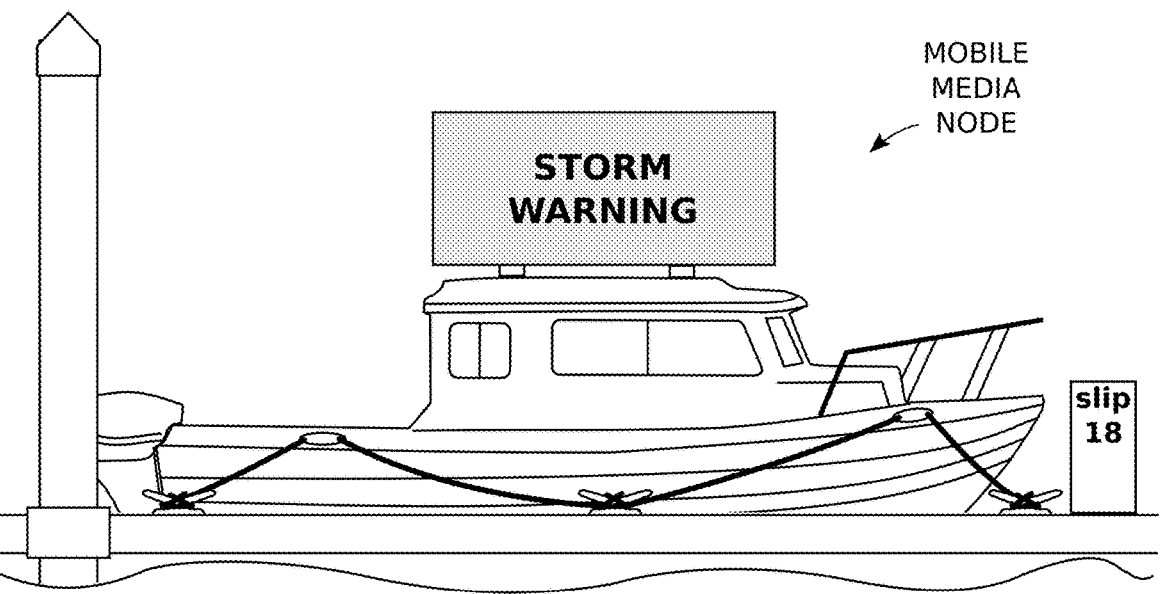
Figure 8H:
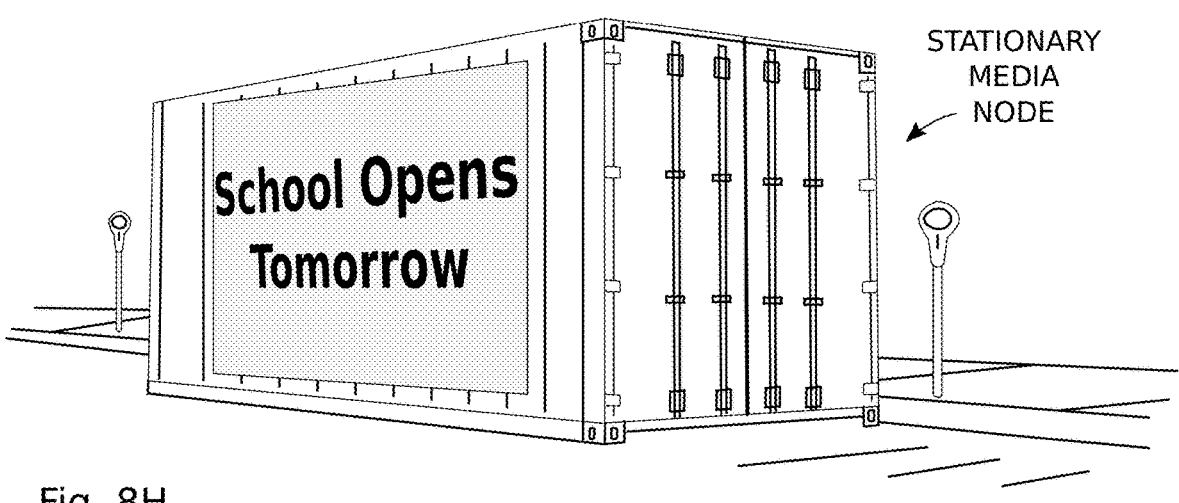
Figure 8I:
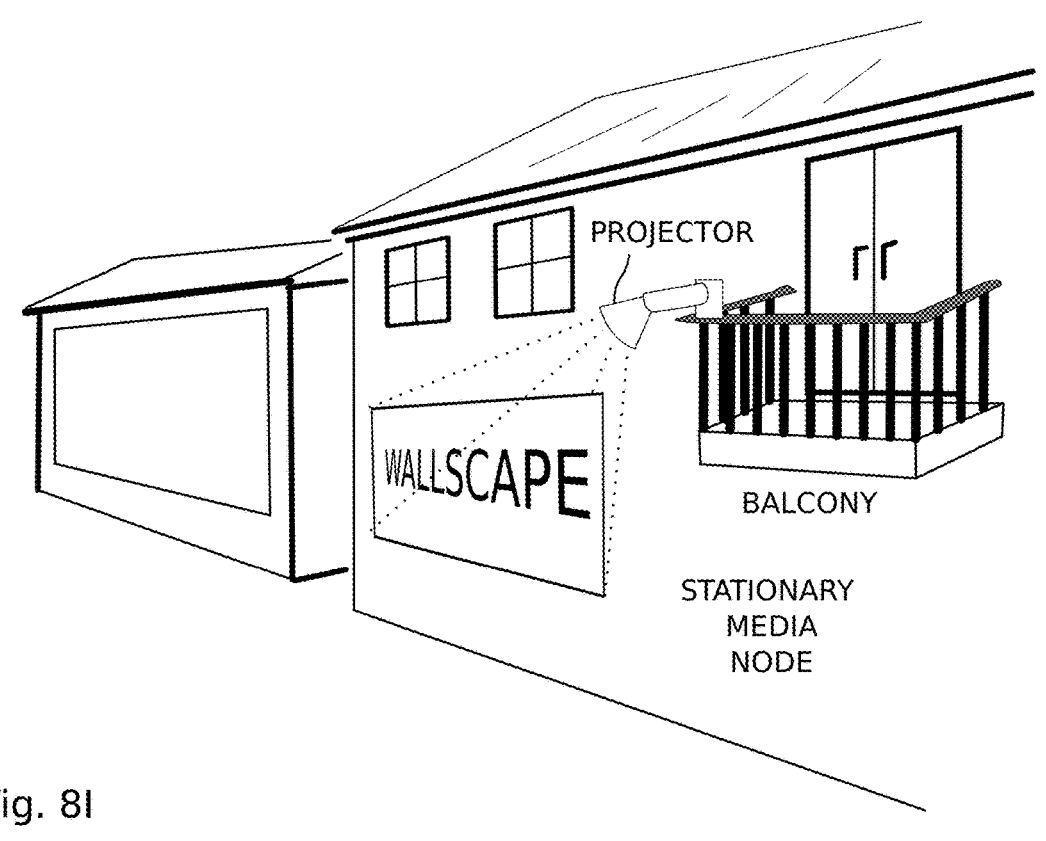
Figure 8J:
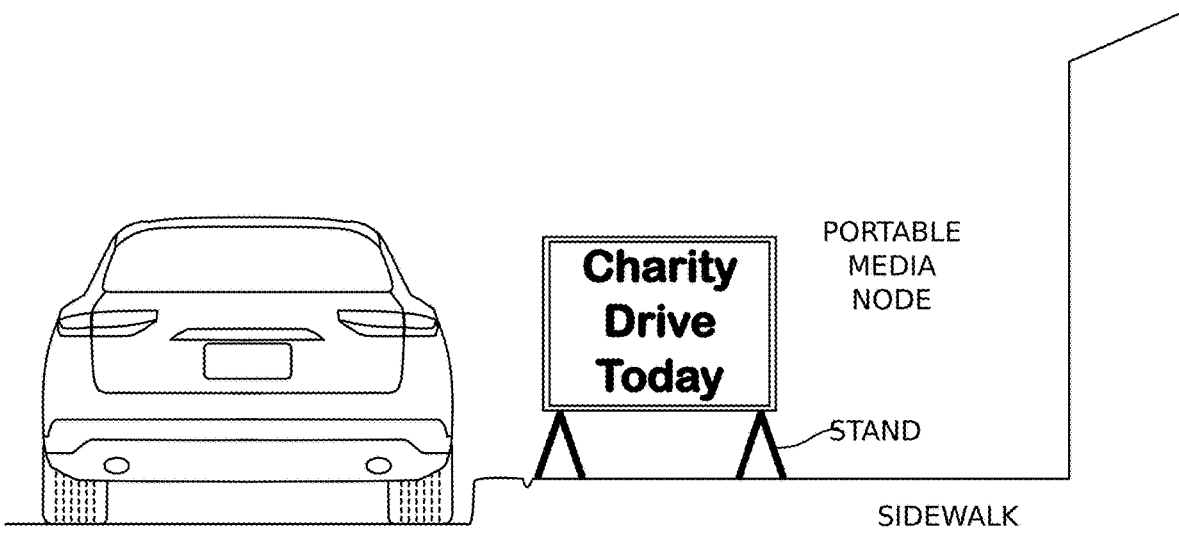
Figure 8K:
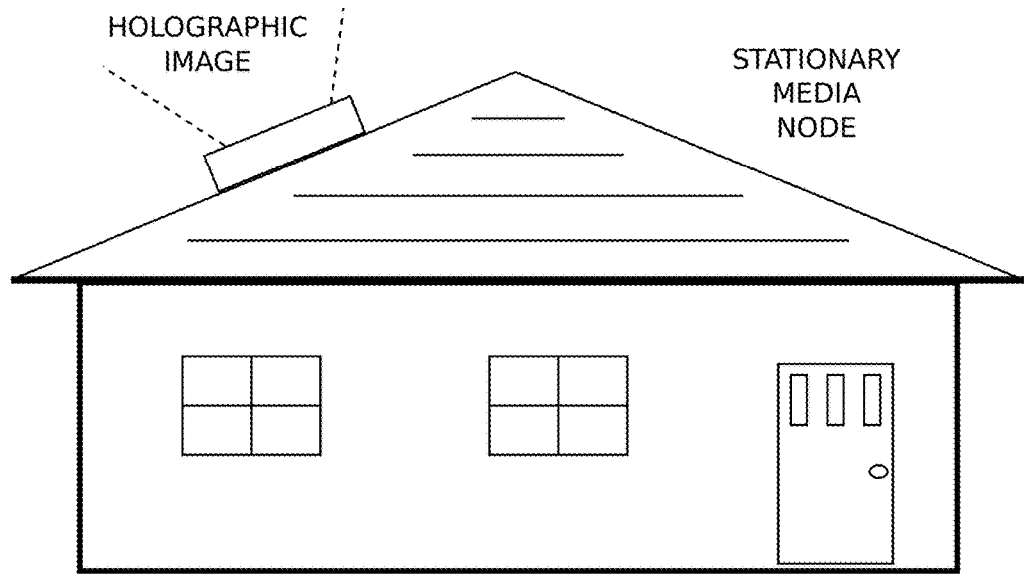
Figure 8D:
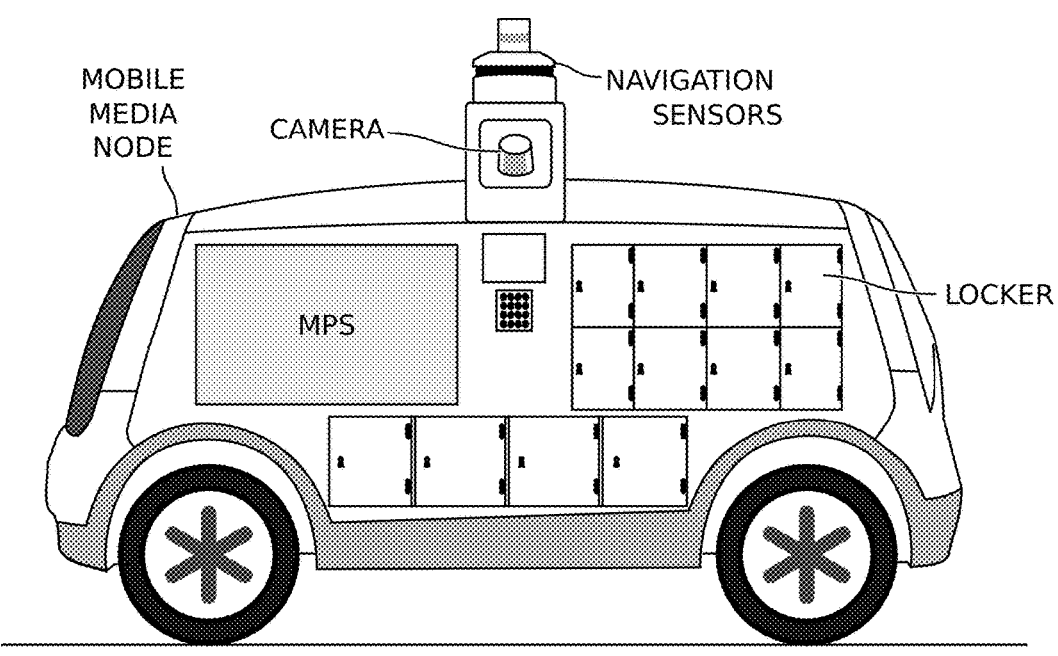
Figure 8L:
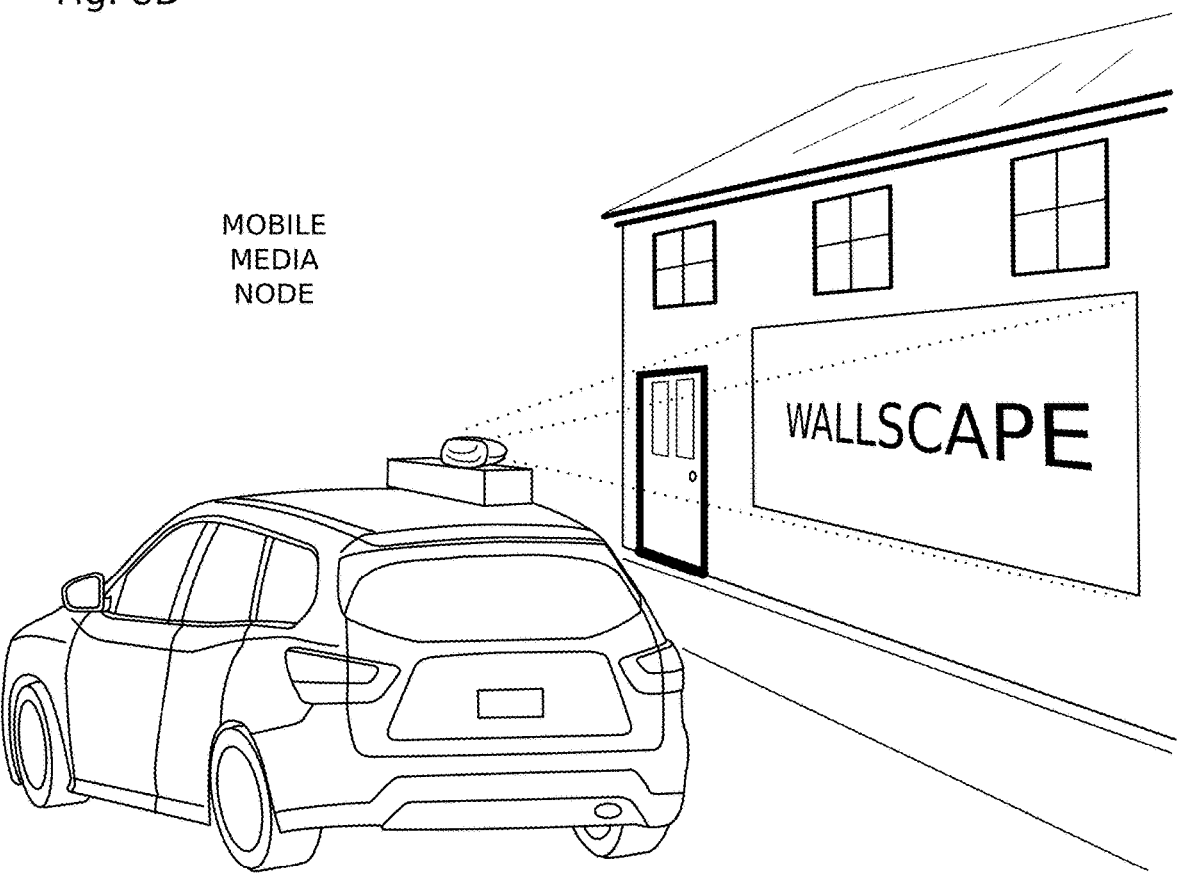

FIG. 7 is a flowchart illustrating a method for local network public notification negotiation. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 700.

Step 702 provides a local network comprising a plurality of neighborhood media nodes. The local network may, for example, be enabled as an Intranet or an Internet website. Each neighborhood media node is configured to project a plurality of n media message per a first time period to a general public, where n is an integer greater than or equal to one. In Step 704 a user interface associated with each neighborhood media node accepts local network program choices including neighborhood media node selections cross-referenced to media message selections. In Step 706 a local arbitrator arranges local network program choice and resolves conflicts. In Step 708 the local arbitrator supplies a local network selection decision to the neighborhood media nodes, and in Step 710 the neighborhood media nodes project media messages in response to the local network selection decision. In one aspect the local arbitrator accepts remote media messages in Step 705b supplied by a remote network source external to the local network, and then in Step 710 the neighborhood media nodes project a combination of neighborhood media messages and remote media messages, cross-referenced to neighborhood media nodes, responsive to the local network selection decision.

In another aspect, the local arbitrator supplies a local network selection decision in Step 708 selecting a maximum number of p neighborhood media messages per first time period for each neighborhood media node, where p is an integer less than or equal to n. A neighborhood media message explicitly associated with a first neighborhood media node is considered a home-neighborhood media message with respect to the first neighborhood media node. As described above, the term "media message explicitly associated with" is intended to describe a relationship such as the message being supplied by the first neighborhood media node owner or manager, or being supplied by an entity having a preferred relationship with the first media node or first local network, as acknowledged by the local arbitrator, at least for a particular message. Then, the local arbitrator supplying the local network selection decision in Step 708 may select a maximum number of t home-neighborhood media messages and a minimum number of q home-neighborhood media messages for each neighborhood media node per first time period, where t is an integer less than or equal to n, and q is less than or equal to t.

A neighborhood media message explicitly associated with a second neighborhood media node is considered an inter-neighborhood media message with respect to a first neighborhood media node. Then, the local arbitrator supplying the local network selection decision in Step 708 may select a maximum number of r inter-neighborhood media messages for each neighborhood media node, where r is an integer less than or equal to n.

A neighborhood media message explicitly associated with a second local network or a neighborhood media node in the second local network is considered an intra-local media message with respect to a first local network neighborhood media node. Then, the local arbitrator supplying the local network selection decision in Step 708 may select a maximum number of s intra-local media messages for each neighbor media node, where s is an integer less than or equal to n.

In a one aspect the remote manager in Step 705*a* accepts remote media messages cross-referenced to neighborhood media nodes, and Step 705*b* accepts remote media message selections supplied by the remote manager in the form of a remote selection decision. In one variation, it is the responsibility of the local arbitrator to resolve conflicts between neighborhood, intra-local, and remote media messages.

Alternatively, in Step 709*a* a remote arbitrator accepts the local selection decision from Step 708 and the remote selection decision from Step 705*b*. In Step 709*b* the remote arbitrator arranges the neighborhood, intra-local, and remote messages for each local network, resolves conflicts between the local selection decision and remote selection decision if necessary, and supplies a final selection decision. Then, in Step 710 the neighborhood media nodes project media messages in response to a final selection decision. For example, the remote arbitrator may supply a final selection decision in Step 709*b* selecting a maximum number of m neighborhood media messages per first time period for each neighborhood media node, where m is an integer less than or equal to n. Alternatively, the remote arbitrator may accept local network program choices and the remote selection decision, and then resolve conflicts in Step 709*b*. That is, Steps 706 and 708 are bypassed.

In one aspect, Step 702 provides a plurality of local networks with a local arbitrator associated with each local network. Then in Step 709*a* the remote arbitrator accepts the remote selection decision and a plurality of local selection decisions, and in Step 709*b* the remote arbitrator arranges neighborhood, intra-local, and remote messages, and resolves conflicts between the plurality of local selection decisions and the remote selection decision.

FIGS. 8A through 8L depict some examples of neighborhood media nodes.

Systems and methods have been provided for local network public notification. Examples of particular message structures, schematic block linkages, and hardware units have been presented to illustrate the invention. However, the invention is not limited to merely these examples. Other variations and embodiments of the invention will occur to those skilled in the art.

We claim:

1. A system for local network public notification negotiation, the system comprising:

a local network comprising a plurality of neighborhood media nodes, each neighborhood media node comprising a communications subsystem, and configured to project a plurality of n media message per a first time period to a general public, where n is an integer greater than or equal to one;

an interface assigned to the neighborhood media nodes (NMNs), each NMN interface having an input for entering local network program choices including neighborhood media node selections cross-referenced to media message selections;

a local arbitrator associated with the local network having an input to accept the local network program choices and remote media messages supplied by a remote network source external to the local network, the local arbitrator arranging local network program choices to create a local network selection decision including messages selected from the group consisting of neighborhood media messages, remote media messages, and combinations thereof, cross-referenced to neighborhood media nodes, and the local arbitrator comprising a communications subsystem to supply the local network selection decision to neighborhood media nodes including a maximum number of p neighborhood media messages per first time period for each neighborhood media node, where p is an integer less than or equal to n; and, wherein the neighborhood media nodes project media messages in response to the local network selection decision.

2. The system of claim 1 wherein a first home-neighborhood media message is defined as being explicitly associated with a first neighborhood media node; and, wherein the local arbitrator supplies the local network selection decision with a maximum number of t first home-neighborhood media messages and a minimum number of q first home-neighborhood media messages for the first neighborhood media node per first time period, where t is an integer less than or equal to n, and q is less than or equal to t.

3. The system of claim 1 wherein a neighborhood media message explicitly associated with a second neighborhood media node is defined as an inter-neighborhood media message with respect to a first neighborhood media node; and, wherein the local arbitrator supplies the local network selection decision with a maximum number of r inter-neighborhood media messages for the first neighborhood media node per first time period, where r is an integer less than or equal to n.

4. The system of claim 1 wherein a media message associated with a second local network is defined as an intra-local media message with respect to a first neighborhood media node in a first local network; and, wherein the first local network arbitrator supplies the local network selection decision with an arrangement selected from the group of intra-local media messages, first local network neighborhood media messages, and combinations thereof.

5. The system of claim 4 wherein the local arbitrator supplies the local network selection decision with a maximum number of s intra-local media messages for the first neighborhood media node per first time period, where s is an integer less than or equal to n; and, wherein each first local network neighborhood media node is configured to project media messages selected from the group consisting of neighborhood media messages, intra-local media messages, and combinations thereof.

6. The system of claim 1 further comprising:

a remote manager having an input to accept remote media messages and an output to supply a remote selection decision, including selected remote media messages, to the local network arbitrator.

7. The system of claim 6 further comprising:

a remote arbitrator having an input to accept the local network selection decision and the remote selection decision, the remote arbitrator arranging messages from the local selection decision and the remote selection decision, and having an output to supply a final selection decision; and, wherein the neighborhood media nodes project media messages in response to the final selection decision.

8. The system of claim 7 wherein the remote arbitrator selects a maximum number of m neighborhood media messages per first time period for each neighborhood media node, where m is an integer less than or equal to n.

9. The system of claim 1 further comprising:

a plurality of local networks, each local network comprising a plurality of neighborhood media nodes; and, a local arbitrator associated with each local network.

10. The system of claim 1 wherein the neighborhood media node is a device selected from the group consisting of a portable kiosk, a mobile kiosk, a permanently stationary kiosk, a wall-mounted sign, a vehicle, a boat, and a drone.

11. The system of claim 1 wherein the local network is an Intranet network.

12. A method for local network public notification negotiation, the method comprising:

providing a local network comprising a plurality of neighborhood media nodes, with each neighborhood media node configured to project a plurality of n media message per a first time period to a general public, where n is an integer greater than or equal to one;

an interface (UI) associated with the neighborhood media nodes accepting local network program choices including neighborhood media node selections cross-referenced to media message selections;

a local arbitrator arranging the local network program choices;

the local arbitrator supplying a local network selection decision, including the arrangement of local network program choices, to the neighborhood media nodes;

the neighborhood media nodes projecting media messages in response to the local network selection decision; and wherein the local arbitrator suppling the local network selection decision includes supplying a decision selecting a maximum number of p neighborhood media messages per first time period for each neighborhood media node, where p is an integer less than or equal to n.

13. The method of claim 12 further comprising:

the local arbitrator accepting remote media messages supplied by a remote network source external to the local network; and, wherein the neighborhood media nodes projecting media messages includes projecting messages selected from the group consisting of neighborhood media messages, remote media messages, and combinations thereof, cross-referenced to neighborhood media nodes, responsive to the local network selection decision.

14. The method of claim 13 further comprising:

a remote manager accepting remote media messages cross-referenced to neighborhood media nodes; and, the remote manager supplying a remote selection decision including selected remote media messages.

15. The method of claim 14 further comprising:

a remote arbitrator having an input to accept the local selection decision and the remote selection decision;

the remote arbitrator arranging messages selected from the group consisting of local media messages and remote media messages, and supplying a final selection decision; and, wherein the neighborhood media nodes projecting media messages includes the neighborhood media nodes projecting the media messages in response to a final selection decision.

16. The method of claim 15 wherein the remote arbitrator supplying the final selection decision includes the remote arbitrator selecting a maximum number of m neighborhood media messages per first time period for each neighborhood media node, where m is an integer less than or equal to n.

17. The method of claim 16 wherein providing the local network includes providing a plurality of local networks, each local network with a plurality of local media nodes and a local arbitrator;

wherein the remote arbitrator having an input to accept the local selection decision and the remote selection decision includes the remote arbitrator accepting the remote selection decision and a plurality of local selection decisions; and, wherein the remote arbitrator arranging messages includes the remote arbitrator arranging messages selected from the group consisting of local media messages from the plurality of local selection decisions and the remote selection decision.

18. The method of claim 12 wherein a neighborhood media message explicitly associated with a first neighborhood media node is defined as a home-neighborhood media message with respect to the first neighborhood media node; and, wherein the local arbitrator supplying the local network selection decision includes supplying a decision selecting a maximum number of t home-neighborhood media messages and a minimum number of q home-neighborhood media messages for each neighborhood media node per first time period, where t is an integer less than or equal to n, and q is less than or equal to t.

19. The method of claim 12 wherein a neighborhood media message explicitly associated with a second neighborhood media node is defined as an inter-neighborhood media message with respect to a first neighborhood media node; and, wherein the local arbitrator supplying the local network selection decision includes supplying a decision selecting a maximum number of r inter-neighborhood media messages for each neighborhood media node, where r is an integer less than or equal to n.

20. The method of claim 12 wherein a neighborhood media message explicitly associated with a second local network is defined as an intra-local media message with respect to a first local network neighborhood media node; and, wherein the local arbitrator supplying the local network selection decision includes supplying a decision selecting a maximum number of s intra-local media messages for each neighbor media node, where s is an integer less than or equal to n.

21. The method of claim 12 wherein the local network is an Intranet network.

22. A method for local network public notification negotiation, the method comprising:

providing a local network comprising a plurality of neighborhood media nodes, with each neighborhood media node configured to project a plurality of n media message per a first time period to a general public, where n is an integer greater than or equal to one;

an interface (UI) associated with the neighborhood media nodes accepting local network program choices including neighborhood media node selections cross-referenced to media message selections;

a local arbitrator arranging the local network program choices;

the local arbitrator supplying a local network selection decision, including the arrangement of local network program choices, to the neighborhood media nodes;

the neighborhood media nodes projecting media messages in response to the local network selection decision;

wherein a neighborhood media message explicitly associated with a first neighborhood media node is defined as a home-neighborhood media message with respect to the first neighborhood media node; and, wherein the local arbitrator supplying the local network selection decision includes supplying a decision selecting a maximum number of t home-neighborhood media messages and a minimum number of q home-neighborhood media messages for each neighborhood media node per first time period, where t is an integer less than or equal to n, and q is less than or equal to t.

23. The method of claim 22 wherein the local arbitrator suppling the local network selection decision includes supplying a decision selecting a maximum number of p neighborhood media messages per first time period for each neighborhood media node, where p is an integer less than or equal to n.

24. The method of claim 22 further comprising:

the local arbitrator accepting remote media messages supplied by a remote network source external to the local network; and, wherein the neighborhood media nodes projecting media messages includes projecting messages selected from the group consisting of neighborhood media messages, remote media messages, and combinations thereof, cross-referenced to neighborhood media nodes, responsive to the local network selection decision.

25. The method of claim 24 further comprising:

a remote manager accepting remote media messages cross-referenced to neighborhood media nodes; and, the remote manager supplying a remote selection decision including selected remote media messages.

* * * * *